US009185161B2

(12) United States Patent
Messinger et al.

(10) Patent No.: US 9,185,161 B2
(45) Date of Patent: Nov. 10, 2015

(54) SYSTEMS AND METHODS FOR SYNCHRONIZING NON-DESTRUCTIVE TESTING DEVICES

(71) Applicant: General Electric Company, Schenectady, NY (US)

(72) Inventors: Jason Howard Messinger, Andover, MA (US); Michael Christopher Domke, Skaneateles, NY (US); Scott Leo Sbihli, Lexington, MA (US); Robert Carroll Ward, Essex, CT (US); Francois Xavier De Fromont, State College, PA (US)

(73) Assignee: General Electric Company, Schenectady, NY (US)

( * ) Notice: Subject to any disclaimer, the term of this patent is extended or adjusted under 35 U.S.C. 154(b) by 223 days.

(21) Appl. No.: 13/732,309

(22) Filed: Dec. 31, 2012

(65) Prior Publication Data
US 2014/0189048 A1   Jul. 3, 2014

(51) Int. Cl.
*H04L 29/08* (2006.01)
*G06F 21/44* (2013.01)

(52) U.S. Cl.
CPC ............... *H04L 67/10* (2013.01); *G06F 21/44* (2013.01)

(58) Field of Classification Search
CPC ............. H04L 29/08072; H04L 29/06; H04L 29/0809; H04L 67/10; H04L 67/1044; G06F 8/70; G06F 9/4411; G06F 19/3412; G06F 21/44; G03B 17/14; H04N 5/23225
See application file for complete search history.

(56) References Cited

U.S. PATENT DOCUMENTS

| 5,603,323 | A | * | 2/1997 | Pflugrath et al. | ............... 600/437 |
| 6,078,681 | A | * | 6/2000 | Silver | ............................ 382/133 |
| 6,317,039 | B1 | | 11/2001 | Thomason | |
| 6,830,545 | B2 | | 12/2004 | Bendall | |
| 7,149,789 | B2 | * | 12/2006 | Slivka et al. | .................. 709/219 |
| 7,173,526 | B1 | * | 2/2007 | Monroe | ......................... 340/521 |
| 7,356,393 | B1 | * | 4/2008 | Schlatre et al. | .............. 701/29.3 |
| 7,367,236 | B2 | * | 5/2008 | Georgeson et al. | ............. 73/801 |
| 7,493,289 | B2 | * | 2/2009 | Verosub et al. | .................. 705/51 |
| 7,587,593 | B2 | * | 9/2009 | Murakoshi | .................... 713/165 |
| 8,051,414 | B2 | * | 11/2011 | Stender et al. | ................ 717/168 |
| 8,059,882 | B2 | | 11/2011 | Amidi | |
| 8,108,168 | B2 | | 1/2012 | Sharp et al. | |
| 8,255,170 | B2 | | 8/2012 | Kollgaard et al. | |
| 8,775,552 | B1 | * | 7/2014 | Kessel et al. | .................. 709/217 |
| 2002/0198997 | A1 | | 12/2002 | Linthicum et al. | |
| 2004/0127196 | A1 | | 7/2004 | Dabbish et al. | |

(Continued)

OTHER PUBLICATIONS

Translation of Foreign Patent, CN102735751.*

(Continued)

*Primary Examiner* — Brian J Gillis
*Assistant Examiner* — Matthew Ballard
(74) *Attorney, Agent, or Firm* — Fletcher Yoder, P.C.

(57) ABSTRACT

A non-transitory computer readable medium may include executable instructions which, when executed by a processor, cause the processor to transmit device identification information and to receive a space requirement based on a digital content. The instructions further cause the processor to compare a memory space to the space requirement, and if the memory space is greater than the space requirement, receive a digital content based on the device identification, wherein the digital content is configured to be executed by, used by, or displayed by a non-destructive testing (NDT) device, or a combination thereof.

18 Claims, 13 Drawing Sheets

(56) References Cited

U.S. PATENT DOCUMENTS

| | | | |
|---|---|---|---|
| 2005/0068041 A1* | 3/2005 | Kress et al. | 324/527 |
| 2007/0067597 A1* | 3/2007 | Chen et al. | 711/170 |
| 2007/0106750 A1* | 5/2007 | Moore | 709/217 |
| 2007/0106752 A1* | 5/2007 | Moore | 709/217 |
| 2008/0319851 A1* | 12/2008 | Grigorovitch et al. | 705/14 |
| 2010/0325735 A1 | 12/2010 | Etchegoyen | |
| 2012/0254768 A1 | 10/2012 | Aggarwal et al. | |

OTHER PUBLICATIONS

Sorrel, Charlie. iControlPad Ships at Last [online], [retrieved on Mar. 21, 2013]. Retrieved from the Internet <URL: http://www.wired.com/gadgetlab/2011/11/icontroipad-ships-at-last/>.

OmniSean MX [online]. p. 5. Olympus, 2010 [retrieved on Mar. 28, 2013]. Retrieved from the Internet: <URL: www.olympus-ims.com/en/omniscan-mx/>.

Georgeson, Gary, [online], [retrieved on Mar. 28, 2013]. http://www.meetingdata.utcdayton.com/agenda/airworthiness/2012/proceedings/presentations/P5526.pdf.

Phasor XS User's Manual [online]. General Electric: Measurement & Control Solutions. [retrieved on Mar. 28, 2013]. Retrieved from the Internet: <URL: www.ge-mcs.com/download/ultrasound/portable-flaw-detectors/Phasor%20Series/om-phasor-en_rev10.pdf>.

USM Vision 1.2—A Total Weld Inspection Soiution to Increase Productivity in New Process Pipework Fabrication [online]. General Electric: Measurement & Control. [retrieved on Mar. 28, 2013] Retrieved from the Internet: <URL.: www.ge-mcs.com/download/ultrasound/portable-flaw-detectors/usm-vision/GEIT-USMVision-20058EN_LR.pdf>.

U.S. Appl. No. 13/732,238, filed Dec. 31, 2012, Michael Christopher Domke.

U.S. Appl. No. 13/732,252, filed Dec. 31, 2012, Kevin Andrew Coombs.

U.S. Appl. No. 13/732,261, filed Dec. 31, 2012, Eugene Schiefer.

U.S. Appl. No. 13/732,281, filed Dec. 31, 2012, Jason Howard Messinger.

U.S. Appl. No. 13/732,293, filed Dec. 31, 2012, Jason Howard Messinger.

U.S. Appl. No. 13/732,303, filed Dec. 31, 2012, Thomas Eldred Lambdin.

U.S. Appl. No. 13/732,268, filed Dec. 31, 2012, Scott Leo Sbihli.

U.S. Appl. No. 13/732,272, filed Dec. 31, 2012, Jason Howard Messinger.

U.S. Appl. No. 13/732,319, filed Dec. 31, 2012, Michael Christopher Domke.

U.S. Appl. No. 13/732,327, filed Dec. Dec. 31, 2012, Michael Christopher Domke.

U.S. Appl. No. 13/747,408, filed Jan. 22, 2013, Michael Christopher Domke.

U.S. Appl. No. 13/747,435, filed Jan. 22, 2013, Jason Howard Messinger.

U.S. Appl. No. 13/747,438, filed Jan. 22, 2013, Jason Howard Messinger.

U.S. Appl. No. 13/747,457, filed Jan. 22, 2013, Jason Howard Messinger.

U.S. Appl. No. 13/747,453, filed Jan. 22, 2013, Sekhar Soorianarayanan.

U.S. Appl. No. 13/747,429, filed Jan. 22, 2013, Sekhar Soorianarayanan.

U.S. Appl. No. 13/747,464, filed Jan. 22, 2013, Sekhar Soorianarayanan.

U.S. Appl. No. 13/747,443, filed Jan. 22, 2013, Jason Howard Messinger.

U.S. Appl. No. 13/747,449, filed Jan. 22, 2013, Michael Christopher Domke.

U.S. Appl. No. 13/747,456, filed Jan. 22, 2013, Michael Christopher Domke.

U.S. Appl. No. 13/747,416, filed Jan. 22, 2013, Michael Christopher Domke.

U.S. Appl. No. 13/800,015, filed Mar. 13, 2013, Kevin Andrews Coombs.

PCT Search Report and Written Opinion issued Mar. 20, 2014 in connection with corresponding PCT Application No. PCT/US2013/072544.

* cited by examiner

SYSTEMS AND METHODS FOR SYNCHRONIZING NON-DESTRUCTIVE TESTING DEVICES

BACKGROUND

The subject matter disclosed herein relates to non-destructive testing (NDT) systems, and particularly to systems and methods for a NDT ecosystem.

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support. During equipment operations, the equipment may degrade, encounter undesired conditions such as corrosion, wear and tear, and so on, potentially affecting overall equipment effectiveness. Certain inspection techniques, such as non-destructive inspection techniques or non-destructive testing (NDT) techniques, may be used to detect undesired equipment conditions.

In a conventional NDT system, data may be shared with other NDT operators or personnel using portable memory devices, paper, or through the telephone. As such, the amount of time to share data between NDT personnel may depend largely on the speed at which the physical portable memory device is physically dispatched to its target. Accordingly, it would be beneficial to improve the data sharing capabilities of the NDT system, for example, to more efficiently test and inspect a variety of systems and equipment.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a non-transitory computer readable medium may include executable instructions which, when executed by a processor, cause the processor to transmit device identification information and to receive a space requirement based on a digital content. The instructions further cause the processor to compare a memory space to the space requirement, and if the memory space is greater than the space requirement, receive a digital content based on the device identification, wherein the digital content is configured to be executed by, used by, or displayed by a non-destructive testing (NDT) device, or a combination thereof.

In another embodiment, a system may include a non-destructive testing (NDT) device comprising a memory and a processor configured to transmit a device identification information and to receive instructions to add, update, or delete a digital content based on the device identification information. The processor is further configured to execute the instructions, wherein the memory is configured to store the digital content.

In yet another embodiment, a method may include selecting a synchronization option, and transmitting a device identification information. The method may further include receiving a space requirement based on a digital content, and comparing a memory space to the space requirement, and if the memory space is greater than the space requirement, receiving a digital content based on the device identification, wherein the digital content is configured to be executed by, used by, or displayed by a non-destructive testing (NDT) device, or a combination thereof.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
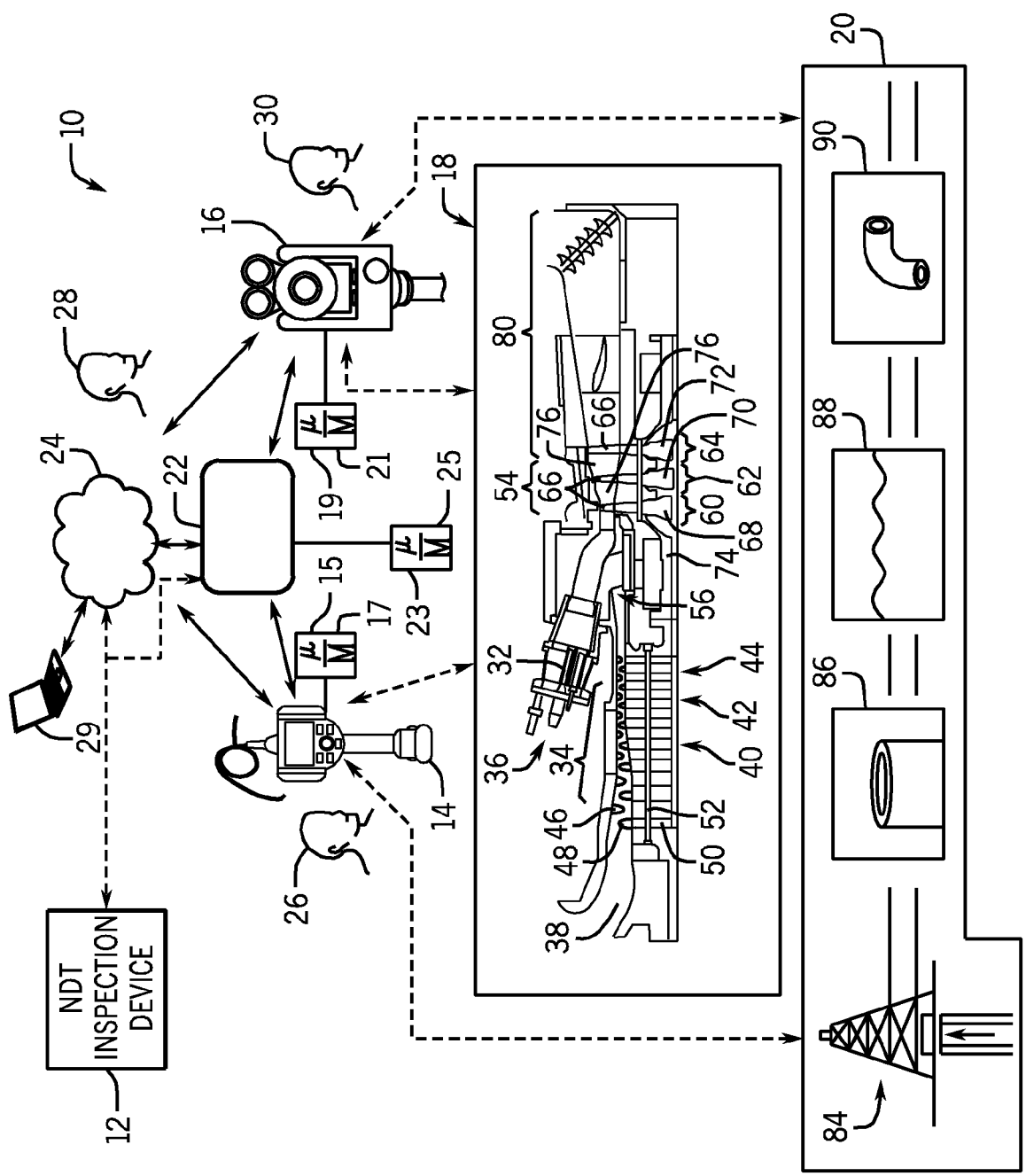
FIG. 1 is a block diagram illustrating an embodiment of a distributed non-destructive testing (NDT) system, including a mobile device.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection and testing techniques, including non-destructive testing (NDT) or inspection systems. In the NDT system, certain techniques such as borescopic inspection, weld inspection, remote visual inspections, x-ray inspection, ultrasonic inspection, eddy current inspection, and the like, may be used to analyze and detect a variety of conditions, including but not limited to corrosion, equipment wear and tear, cracking, leaks, and so on. The techniques described herein provide for improved NDT systems suitable for borescopic inspection, remote visual inspections (e.g., inspections using remotely operated vehicles), x-ray inspection, ultrasonic inspection, and/or eddy current inspection, enabling enhanced data gathering, data analysis, data storage/archiving, inspection/testing processes, and NDT collaboration techniques.

The improved NDT systems described herein may include inspection equipment using wired or wireless conduits suitable for communicatively coupling the inspection equipment to mobile devices, such as tablets, smart phones, and augmented reality eyeglasses; to computing devices, such as notebooks, laptops, workstations, personal computers; and to "cloud" computing systems, such as cloud-based NDT ecosystems, cloud analytics, cloud-based collaboration and workflow systems, distributed computing systems, expert systems and/or knowledge-based systems. Indeed, the techniques described herein may provide for enhanced NDT data gathering, analysis, and data distribution, thus improving the detection of undesired conditions, enhancing maintenance activities, and increasing returns on investment (ROI) of facilities and equipment.

In one embodiment, a tablet may be communicatively coupled to the NDT inspection device (e.g., borescope, transportable pan-tilt-zoom camera, eddy current device, x-ray inspection device, ultrasonic inspection device), such as a MENTOR™ NDT inspection device, available from General Electric, Co., of Schenectady, N.Y., and used to provide, for example, enhanced wireless display capabilities, remote control, data analytics and/or data communications to the NDT inspection device. While other mobile devices may be used, the use of the tablet is apt, however, insofar as the tablet may provide for a larger, higher resolution display, more powerful processing cores, an increased memory, and improved battery life. Using a tablet (or other like device) also allows for $3^{rd}$ party development using available toolkits. For example, running data through a tablet opens us up to exchange information with $3^{rd}$ party developers, developing on that same platform or operating system (OS). Accordingly, the tablet may address certain issues, such as providing for improved visualization of data, improving the manipulatory control of the inspection device, and extending collaborative sharing to a plurality of external systems and entities.

Keeping the foregoing in mind, the present disclosure is directed towards sharing data acquired from the NDT system, control of applications and/or devices in the NDT system, and data archiving/storage. Generally, data generated from the NDT system may be automatically distributed to various people or groups of people using techniques disclosed herein. Moreover, content displayed by an application used to monitor and/or control devices in the NDT system may be shared between individuals to create a virtual collaborative environment for monitoring and controlling the devices in the NDT system.

By way of introduction, and turning now to FIG. 1, the figure is a block diagram of an embodiment of distributed NDT system 10. In the depicted embodiment, the distributed NDT system 10 may include one or more NDT inspection devices 12. The NDT inspection devices 12 may be divided into at least two categories. In one category, depicted in FIG. 1, the NDT inspection devices 12 may include devices suitable for visually inspecting a variety of equipment and environments. In another category, described in more detail with respect to FIG. 2 below, the NDT devices 12 may include devices providing for alternatives to visual inspection modalities, such as x-ray inspection modalities, eddy current inspection modalities, and/or ultrasonic inspection modalities.

In the depicted first example category of FIG. 1, the NDT inspection devices 12 may include a borescope 14 having one or more processors 15 and a memory 17, and a transportable pan-tilt-zoom (PTZ) camera 16 having one or more processors 19 and a memory 21. In this first category of visual inspection devices, the bore scope 14 and PTZ camera 16 may be used to inspect, for example, a turbo machinery 18, and a facility or site 20. As illustrated, the bore scope 14 and the PTZ camera 16 may be communicatively coupled to a mobile device 22 also having one or more processors 23 and a memory 25. The mobile device 22 may include, for example, a tablet, a cell phone (e.g., smart phone), a notebook, a laptop, or any other mobile computing device. The use of a tablet, however, is apt insofar as the tablet provides for a good balance between screen size, weight, computing power, and battery life. Accordingly, in one embodiment, the mobile device 22 may be the tablet mentioned above, available from General Electric Co., of Schenectady, N.Y., and providing for touchscreen input. The mobile device 22 may be communicatively coupled to the NDT inspection devices 12, such as the bore scope 14 and/or the PTZ camera 16, through a variety of wireless or wired conduits. For example, the wireless conduits may include WiFi (e.g., Institute of Electrical and Electronics Engineers [IEEE] 802.11X), cellular conduits (e.g., high speed packet access [HSPA], HSPA+, long term evolution [LTE], WiMax), near field communications (NFC), Bluetooth™, personal area networks (PANs), and the like. The wireless conduits may use a variety of communication protocols, such as TCP/IP, UDP, SCTP, socket layers, and so on. In certain embodiments, the wireless or wired conduits may include secure layers, such as secure socket layers (SSL), virtual private network (VPN) layers, encrypted layers, challenge key authentication layers, token authentication layers, and so on. Wired conduits may include proprietary cabling, RJ45 cabling, co-axial cables, fiber optic cables, and so on.

Additionally or alternatively, the mobile device 22 may be communicatively coupled to the NDT inspection devices 12, such as the borescope 14 and/or the PTZ camera 16, through the "cloud" 24. Indeed, the mobile device 22 may use the cloud 24 computing and communications techniques (e.g., cloud-computing network), including but not limited to HTTP, HTTPS, TCP/IP, service oriented architecture (SOA) protocols (e.g., simple object access protocol [SOAP], web services description languages (WSDLs)) to interface with the NDT inspection devices 12 from any geographic location, including geographic locations remote from the physical location about to undergo inspection. Further, in one embodiment, the mobile device 22 may provide "hot spot" functionality in which mobile device 22 may provide wireless access point (WAP) functionality suitable for connecting the NDT inspection devices 12 to other systems in the cloud 24. Accordingly, collaboration may be enhanced by providing for multi-party workflows, data gathering, and data analysis.

For example, a borescope operator 26 may physically manipulate the borescope 14 at one location, while a mobile device operator 28 may use the mobile device 22 to interface with and physically manipulate the bore scope 14 at a second location through remote control techniques. The second location may be proximate to the first location, or geographically distant from the first location. Likewise, a camera operator 30 may physically operate the PTZ camera 16 at a third location, and the mobile device operator 28 may remote control PTZ camera 16 at a fourth location by using the mobile device 22. The fourth location may be proximate to the third location, or geographically distant from the third location. Any and all control actions performed by the operators 26 and 30 may be additionally performed by the operator 28 through the mobile device 22. Additionally, the operator 28 may communicate with the operators 26 and/or 30 by using the devices 14, 16, and 22 through techniques such as voice over IP (VOIP), virtual whiteboarding, text messages, and the like. By providing for remote collaboration techniques between the operator 28 operator 26, and operator 30, the techniques described herein may provide for enhanced workflows and increase resource efficiencies. Indeed, nondestructive testing processes may leverage the communicative coupling of the cloud 24 with the mobile device 22, the NDT inspection devices 12, and external systems coupled to the cloud 24.

In one mode of operation, the mobile device 22 may be operated by the bore scope operator 26 and/or the camera operator 30 to leverage, for example, a larger screen display, more powerful data processing, as well as a variety of interface techniques provided by the mobile device 22, as described in more detail below. Indeed, the mobile device 22 may be operated alongside or in tandem with the devices 14 and 16 by the respective operators 26 and 30. This enhanced flexibility provides for better utilization of resources, including human resources, and improved inspection results.

Whether controlled by the operator 28, 26, and/or 30, the borescope 14 and/or PTZ camera 16 may be used to visually inspect a wide variety of equipment and facilities. For example, the bore scope 14 may be inserted into a plurality of borescope ports and other locations of the turbomachinery 18, to provide for illumination and visual observations of a number of components of the turbomachinery 18. In the depicted embodiment, the turbo machinery 18 is illustrated as a gas turbine suitable for converting carbonaceous fuel into mechanical power. However, other equipment types may be inspected, including compressors, pumps, turbo expanders, wind turbines, hydroturbines, industrial equipment, and/or residential equipment. The turbomachinery 18 (e.g., gas turbine) may include a variety of components that may be inspected by the NDT inspection devices 12 described herein.

With the foregoing in mind, it may be beneficial to discuss certain turbomachinery 18 components that may be inspected by using the embodiments disclosed herein. For example, certain components of the turbomachinery 18 depicted in FIG. 1, may be inspected for corrosion, erosion, cracking, leaks, weld inspection, and so on. Mechanical systems, such as the turbomachinery 18, experience mechanical and thermal stresses during operating conditions, which may require periodic inspection of certain components. During operations of the turbomachinery 18, a fuel such as natural gas or syngas, may be routed to the turbomachinery 18 through one or more fuel nozzles 32 into a combustor 36. Air may enter the turbomachinery 18 through an air intake section 38 and may be compressed by a compressor 34. The compressor 34 may include a series of stages 40, 42, and 44 that compress the air. Each stage may include one or more sets of stationary vanes 46 and blades 48 that rotate to progressively increase the pressure to provide compressed air. The blades 48 may be attached to rotating wheels 50 connected to a shaft 52. The compressed discharge air from the compressor 34 may exit the compressor 34 through a diffuser section 56 and may be directed into the combustor 36 to mix with the fuel. For example, the fuel nozzles 32 may inject a fuel-air mixture into the combustor 36 in a suitable ratio for optimal combustion, emissions, fuel consumption, and power output. In certain embodiments, the turbomachinery 18 may include multiple combustors 36 disposed in an annular arrangement. Each combustor 36 may direct hot combustion gases into a turbine 54.

As depicted, the turbine 54 includes three separate stages 60, 62, and 64 surrounded by a casing 76. Each stage 60, 62, and 64 includes a set of blades or buckets 66 coupled to a respective rotor wheel 68, 70, and 72, which are attached to a shaft 74. As the hot combustion gases cause rotation of turbine blades 66, the shaft 74 rotates to drive the compressor 34 and any other suitable load, such as an electrical generator. Eventually, the turbomachinery 18 diffuses and exhausts the combustion gases through an exhaust section 80. Turbine components, such as the nozzles 32, intake 38, compressor 34, vanes 46, blades 48, wheels 50, shaft 52, diffuser 56, stages 60, 62, and 64, blades 66, shaft 74, casing 76, and exhaust 80, may use the disclosed embodiments, such as the NDT inspection devices 12, to inspect and maintain said components.

Additionally, or alternatively, the PTZ camera 16 may be disposed at various locations around or inside of the turbo machinery 18, and used to procure visual observations of these locations. The PTZ camera 16 may additionally include one or more lights suitable for illuminating desired locations, and may further include zoom, pan and tilt techniques described in more detail below with respect to FIG. 4, useful for deriving observations around in a variety of difficult to reach areas. The borescope 14 and/or the camera 16 may be additionally used to inspect the facilities 20, such as an oil and gas facility 20. Various equipment such as oil and gas equipment 84, may be inspected visually by using the borescope 14 and/or the PTZ camera 16. Advantageously, locations such as the interior of pipes or conduits 86, underwater (or underfluid) locations 88, and difficult to observe locations such as locations having curves or bends 90, may be visually inspected by using the mobile device 22 through the borescope 14 and/or PTZ camera 16. Accordingly, the mobile device operator 28 may more safely and efficiently inspect the equipment 18, 84 and locations 86, 88, and 90, and share observations in real-time or near real-time with location geographically distant from the inspection areas. It is to be understood that other NDT inspection devices 12 may be use the embodiments described herein, such as fiberscopes (e.g., articulating fiberscope, non-articulating fiberscope), and remotely operated vehicles (ROVs), including robotic pipe inspectors and robotic crawlers.

Figure 2:
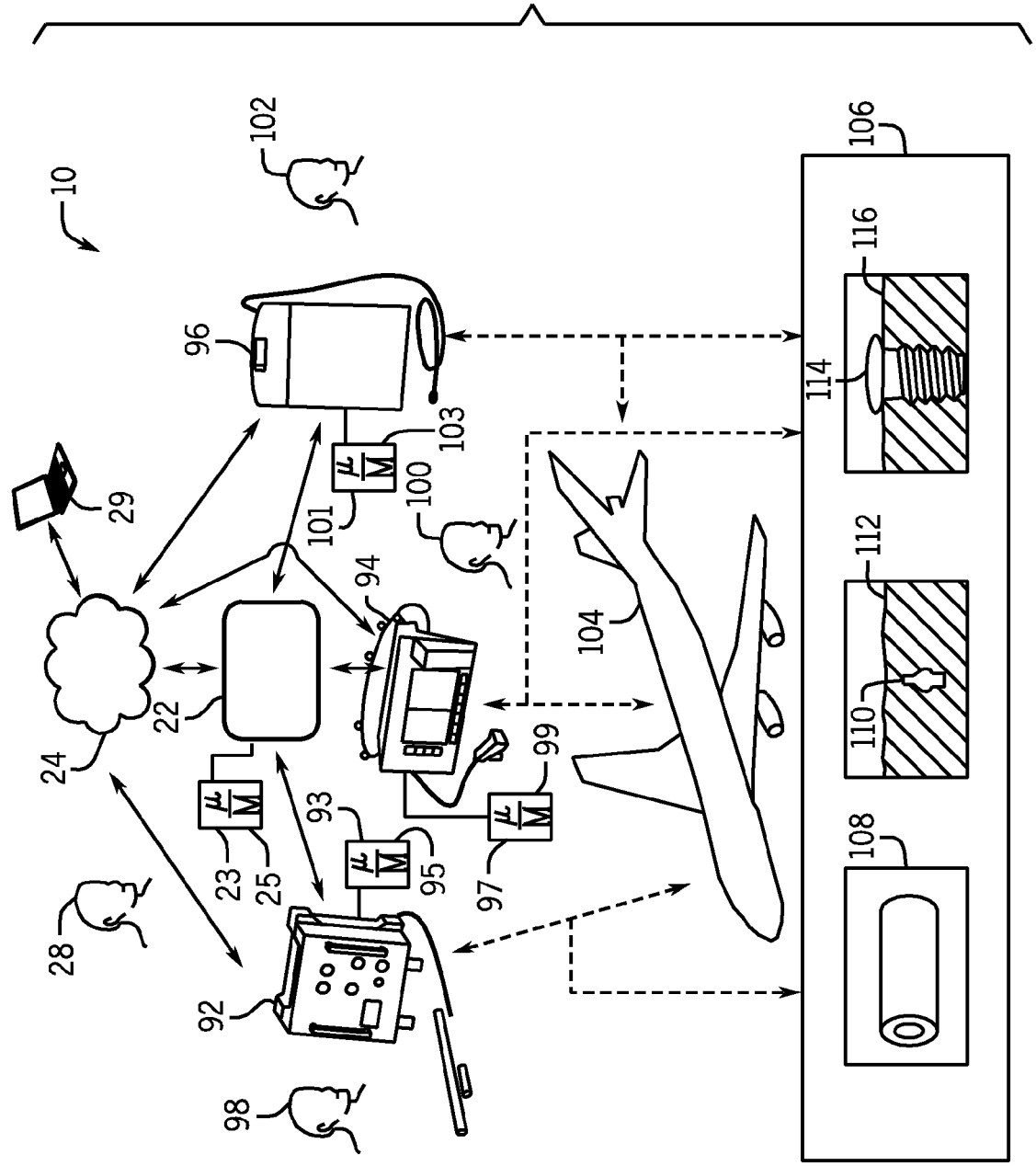
FIG. 2 is a block diagram illustrating further details of an embodiment of the distributed NDT system of FIG. 1.

Turning now to FIG. 2, the figure is a block diagram of an embodiment of the distributed NDT system 10 depicting the second category of NDT inspection devices 12 that may be able to provide for alternative inspection data to visual inspection data. For example, the second category of NDT inspection devices 12 may include an eddy current inspection device 92, an ultrasonic inspection device, such as an ultrasonic flaw detector 94, and an x-ray inspection device, such a digital radiography device 96. The eddy current inspection device 92 may include one or more processors 93 and a memory 95. Likewise, the ultrasonic flaw detector 94 may include one or more processors 97 and a memory 99. Similarly, the digital radiography device 96 may include one or more processors 101 and a memory 103. In operations, the eddy current inspection device 92 may be operated by an eddy current operator 98, the ultrasonic flaw detector 94 may be operated by an ultrasonic device operator 100, and the digital radiography device 96 may be operated by a radiography operator 102.

As depicted, the eddy current inspection device 92, the ultrasonic flaw detector 94, and the digital radiography inspection device 96, may be communicatively coupled to the mobile device 22 by using wired or wireless conduits, including the conduits mentioned above with respect to FIG. 1. Additionally, or alternatively, the devices 92, 94, and 96 may be coupled to the mobile device 22 by using the cloud 24, for example the borescope 14 may be connected to a cellular "hotspot," and use the hotspot to connect to one or more experts in borescopic inspection and analysis. Additionally or alternatively, the NDT device 12 may include, for example, cellular technology suitable for communication through cell networks. Accordingly, the mobile device operator 28 may remotely control various aspects of operations of the devices 92, 94, and 96 by using the mobile device 22, and may collaborate with the operators 98, 100, and 102 through voice (e.g., voice over IP [VOIP]), data sharing (e.g., whiteboarding), providing data analytics, expert support and the like, as described in more detail herein.

Accordingly, it may be possible to enhance the visual observation of various equipment, such as an aircraft system 104 and facilities 106, with x-ray observation modalities, ultrasonic observation modalities, and/or eddy current observation modalities. For example, the interior and the walls of pipes 108 may be inspected for corrosion and/or erosion. Likewise, obstructions or undesired growth inside of the pipes 108 may be detected by using the devices 92, 94, and/or 96. Similarly, fissures or cracks 110 disposed inside of certain ferrous or non-ferrous material 112 may be observed. Additionally, the disposition and viability of parts 114 inserted inside of a component 116 may be verified. Indeed, by using the techniques described herein, improved inspection of equipment and components 104, 108, 112 and 116 may be provided. For example, the mobile device 22 may be used to interface with and provide remote control of the devices 14, 16, 92, 94, and 96.

Figure 3:
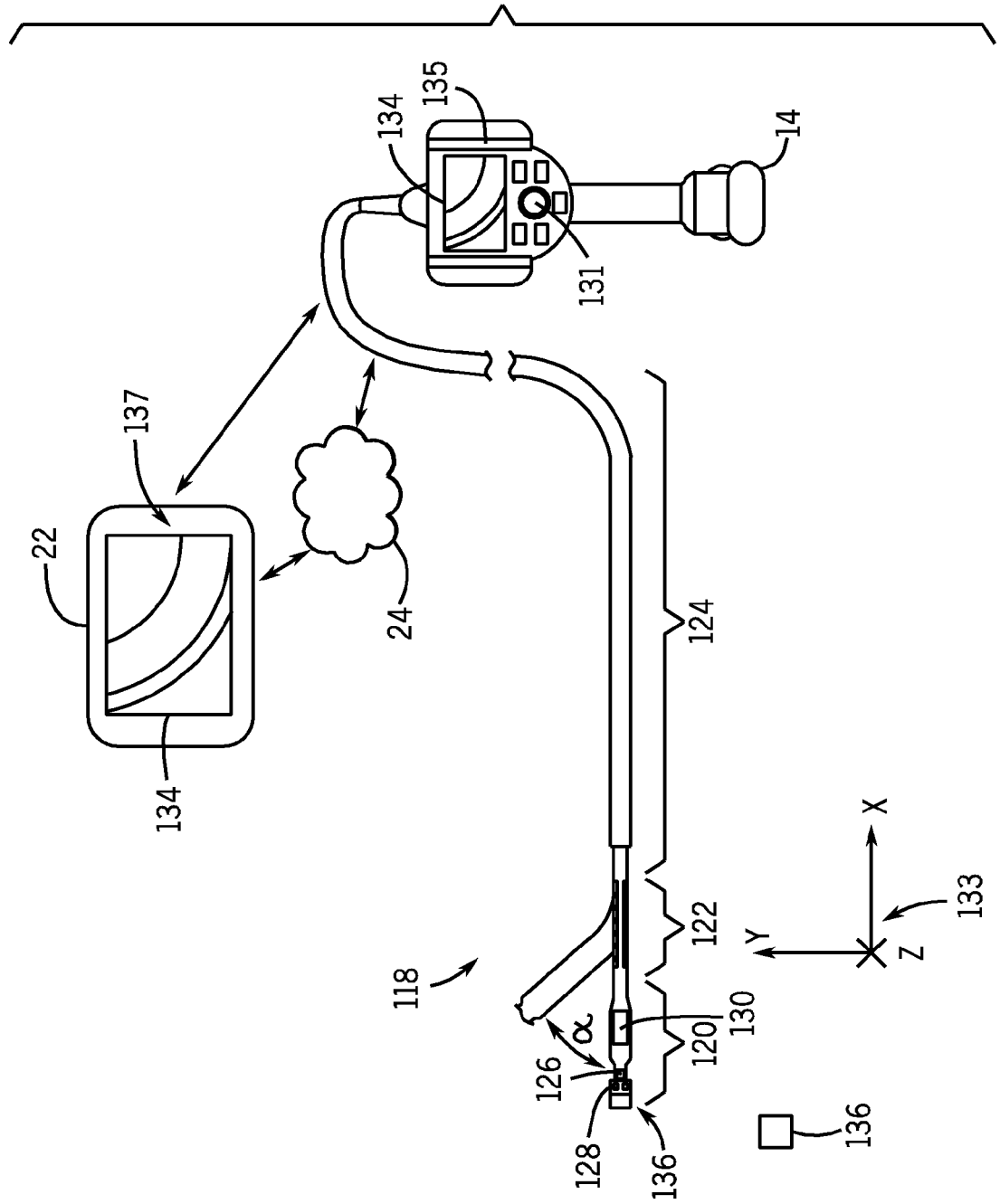
FIG. 3 is a front view illustrating an embodiment of a borescope system 14 communicatively coupled to the mobile device of FIG. 1 and a "cloud;"

FIG. 3 is a front view of the borescope 14 coupled to the mobile device 22 and the cloud 24. Accordingly, the boresecope 14 may provide data to any number of devices connected to the cloud 24 or inside the cloud 24. As mentioned above, the mobile device 22 may be used to receive data from the borescope 14, to remote control the borescope 14, or a combination thereof. Indeed, the techniques described herein enable, for example, the communication of a variety of data from the borescope 14 to the mobile device 22, including but not limited to images, video, and sensor measurements, such as temperature, pressure, flow, clearance (e.g., measurement between a stationary component and a rotary component), and distance measurements. Likewise, the mobile device 22 may communicate control instructions, reprogramming instructions, configuration instructions, and the like, as described in more detail below.

As depicted the borescope 14, includes an insertion tube 118 suitable for insertion into a variety of location, such as inside of the turbomachinery 18, equipment 84, pipes or conduits 86, underwater locations 88, curves or bends 90, varies locations inside or outside of the aircraft system 104, the interior of pipe 108, and so on. The insertion tube 118 may include a head end section 120, an articulating section 122, and a conduit section 124. In the depicted embodiment, the head end section 120 may include a camera 126, one or more lights 128 (e.g., LEDs), and sensors 130. As mentioned above, the borescope's camera 126 may provide images and video suitable for inspection. The lights 128 may be used to provide for illumination when the head end 120 is disposed in locations having low light or no light. In other embodiments, fiber optics may be used to transfer light from a source to the tip 136 of the borescope 14. The light source may include an arc-lamp, LEDs in handsets, LEDs in probe pods sent to probe tips 136, and so on.

During use, the articulating section 122 may be controlled, for example, by the mobile device 22 and/or a physical joy stick 131 disposed on the borescope 14. The articulating sections 122 may steer or "bend" in various dimensions. For example, the articulation section 122 may enable movement of the head end 120 in an X-Y plane X-Z plane and/or Y-Z plane of the depicted XYZ axes 133. Indeed, the physical joystick 131 and/or the mobile device 22 may both be used alone or in combination, to provide control actions suitable for disposing the head end 120 at a variety of angles, such as the depicted angle α. In this manner, the borescope head end 120 may be positioned to visually inspect desired locations. The camera 126 may then capture, for example, a video 134, which may be displayed in a screen 135 of the borescope 14 and a screen 137 of the mobile device 22, and may be recorded by the borescope 14 and/or the mobile device 22. In one embodiment, the screens 135 and 137 may be multi-touchscreens using capacitance techniques, resistive techniques, infrared grid techniques, and the like, to detect the touch of a stylus and/or one or more human fingers. Additionally or alternatively, images and the video 134 may be transmitted into the cloud 24.

Other data, including but not limited to sensor 130 data, may additionally be communicated and/or recorded by the borescope 14. The sensor 130 data may include temperature data, distance data, clearance data (e.g., distance between a rotating and a stationary component), flow data, and so on. In certain embodiments, the borescope 14 may include a plurality of replacement tips 136. For example, the replacement tips 136 may include retrieval tips such as snares, magnetic tips, gripper tips, and the like. The replacement tips 136 may additionally include cleaning and obstruction removal tools, such as wire brushes, wire cutters, and the like. The tips 136 may additionally include tips having differing optical characteristics, such as focal length, stereoscopic views, 3-dimensional (3D) phase views, shadow views, and so on. Additionally or alternatively, the head end 120 may include a removable and replaceable head end 120. Accordingly, a plurality of head ends 120 may be provided at a variety of diameters, and the insertion tube 118 may be disposed in a number of locations having openings from approximately one millimeter to ten millimeters or more. Indeed, a wide variety of equipment and facilities may be inspected, and the data may be shared through the mobile device 22 and/or the cloud 24.

Figure 4:
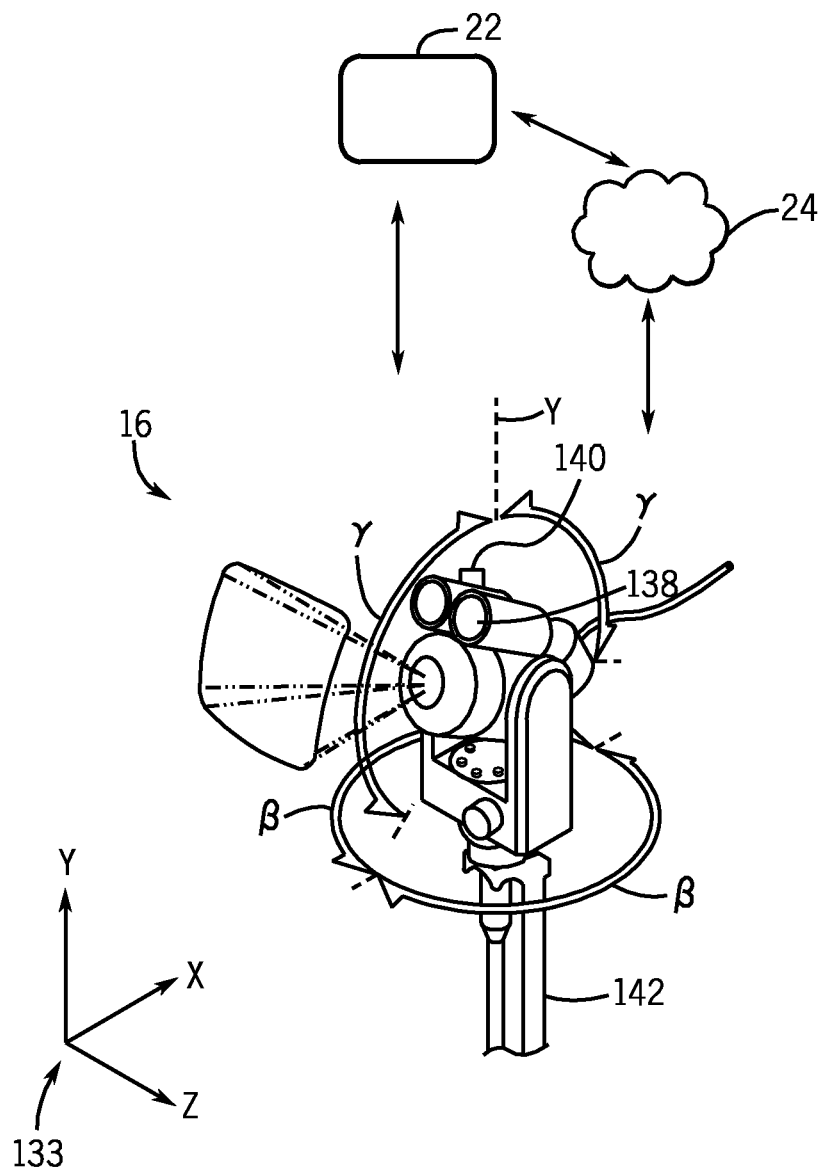
FIG. 4 is an illustration of an embodiment of a pan-tilt-zoom (PTZ) camera system communicatively coupled to the mobile device of FIG. 1.

FIG. 4 is a perspective view of an embodiment of the transportable PTZ camera 16 communicatively coupled to the mobile device 22 and to the cloud 24. As mentioned above, the mobile device 22 and/or the cloud 24 may remotely manipulate the PTZ camera 16 to position the PTZ camera 16 to view desired equipment and locations. In the depicted example, the PTZ camera 16 may be tilted and rotated about the Y-axis. For example, the PTZ camera 16 may be rotated at an angle β between approximately 0° to 180°, 0° to 270°, 0° to 360°, or more about the Y-axis. Likewise, the PTZ camera 16 may be tilted, for example, about the Y-X plane at an angle γ of approximately 0° to 100°, 0° to 120°, 0° to 150°, or more with respect to the Y-Axis. Lights 138 may be similarly controlled, for example, to active or deactivate, and to increase or decrease a level of illumination (e.g., lux) to a desired value. Sensors 140, such as a laser rangefinder, may also be mounted onto the PTZ camera 16, suitable for measuring distance to certain objects. Other sensors 140 may be used, including long-range temperature sensors (e.g., infrared temperature sensors), pressure sensors, flow sensors, clearance sensors, and so on.

The PTZ camera 16 may be transported to a desired location, for example, by using a shaft 142. The shaft 142 enables the camera operator 30 to move the camera and to position the camera, for example, inside of locations 86, 108, underwater 88, into hazardous (e.g., hazmat) locations, and so on. Additionally, the shaft 142 may be used to more permanently secure the PTZ camera 16 by mounting the shaft 142 onto a permanent or semi-permanent mount. In this manner, the PTZ camera 16 may be transported and/or secured at a desired location. The PTZ camera 16 may then transmit, for example by using wireless techniques, image data, video data, sensor 140 data, and the like, to the mobile device 22 and/or cloud 24. Accordingly, data received from the PTZ camera 16 may be remotely analyzed and used to determine the condition and suitability of operations for desired equipment and facilities. Indeed, the techniques described herein may provide for a comprehensive inspection and maintenance process suitable for planning, inspecting, analyzing, and/or sharing a variety of data by using the aforementioned devices 12, 14, 16, 22, 92, 94, 96, and the cloud 24, as described in more detail below with respect to FIG. 5.

Figure 5:
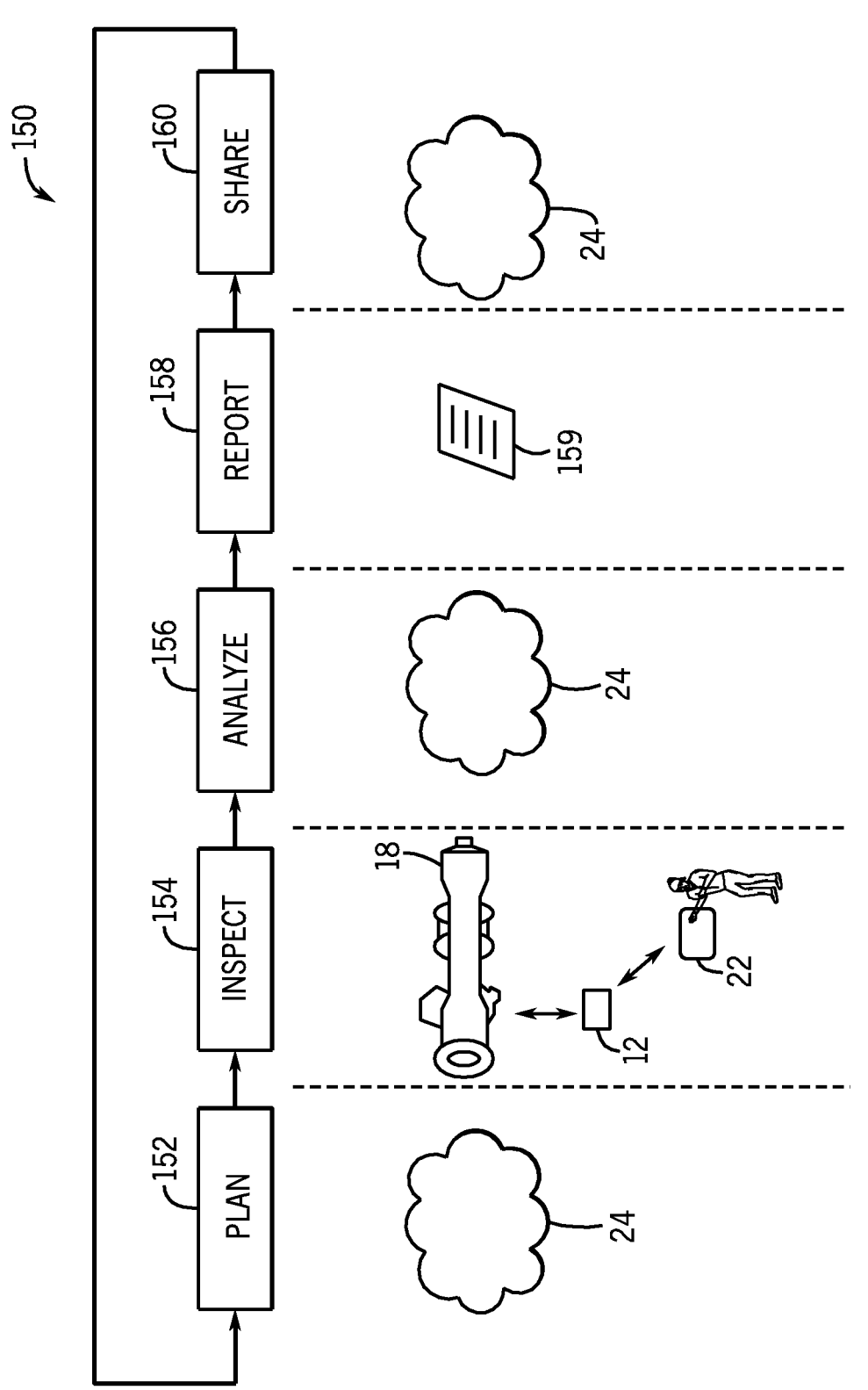
FIG. 5 is a flowchart illustrating an embodiment of a process useful in using the distributed NDT system for planning, inspecting, analyzing, reporting, and sharing of data, such as inspection data.

FIG. 5 is a flowchart of an embodiment of a process 150 suitable for planning, inspecting, analyzing, and/or sharing a variety of data by using the aforementioned devices 12, 14, 16, 22, 92, 94, 96, and the cloud 24. Indeed, the techniques described herein may use the devices 12, 14, 16, 22, 92, 94, 96 to enable processes, such as the depicted process 150, to more efficiently support and maintain a variety of equipment. In certain embodiments, the process 150 or portions of the process 150 may be included in non-transitory computer-readable media stored in memory, such as the memory 17, 21, 25, 95, 99, 103 and executable by one or more processors, such as the processors 15, 19, 23, 93, 97, 101.

In one example, the process 150 may plan (block 152) for inspection and maintenance activities. Data acquired by using the devices 12, 14, 16, 22, 42, 44, 46, an others, such as fleet data (e.g., fuel composition data, flow data, temperature data, clearance data between a stationary and a rotary component, vibration data, speed data, and more generally, sensor data) acquired from a fleet of turbomachinery 18, from equipment users (e.g., aircraft 54 service companies), and/or equipment manufacturers, may be used to plan (block 152) maintenance and inspection activities, more efficient inspection schedules for machinery, flag certain areas for a more detailed inspection, and so on. The process 150 may then enable the use of a single mode or a multi-modal inspection (block 154) of desired facilities and equipment (e.g., turbomachinery 18). As mentioned above, the inspection (block 154) may use any one or more of the NDT inspection devices 12 (e.g., borescope 14, PTZ camera 16, eddy current inspection device 92, ultrasonic flaw detector 94, digital radiography device 96), thus providing with one or more modes of inspection (e.g., visual, ultrasonic, eddy current, x-ray). In the depicted embodiment, the mobile device 22 may be used to remote control the NDT inspection devices 12, to analyze data communicated by the NDT inspection devices 12, to provide for additional functionality not included in the NDT inspection devices 12 as described in more detail herein, to record data from the NDT inspection devices 12, and to guide the inspection (block 154), for example, by using menu driven or menu directed inspection (MDI) techniques, among others.

Results of the inspection (block 154), may then be analyzed (block 156), for example, by using the NDT device 12, by transmitting inspection data to the cloud 24, by using the mobile device 22, or a combination thereof. The analysis may include engineering analysis useful in determining remaining life for the facilities and/or equipment, wear and tear, corrosion, erosion, and so forth. The analysis may additionally include operations research (OR) analysis used to provide for more efficient parts replacement schedules, maintenance schedules, equipment utilization schedules, personnel usage schedules, new inspection schedules, and so on. The analysis (block 156) may then be reported (block 158), resulting in one or more reports 159, including reports created in or by using the cloud 24, detailing the inspection and analysis performed and results obtained. The reports 159 may then be shared (block 160), for example, by using the cloud 24, the mobile device 22, and other techniques, such as workflow sharing techniques. In one embodiment, the process 150 may be iterative, thus, the process 150 may iterate back to planning (block 152) after the sharing (block 160) of the reports 159. As an iterative process 150, the analyze (block 156) and report (block 158) may inform the planning (block 152). By providing for embodiments useful in using the devices (e.g., 12, 14, 16, 22, 92, 94, 96) described herein to plan, inspect, analyze, report, and share data, the techniques described herein may enable a more efficient inspection and maintenance of the facilities 20, 106 and the equipment 18, 104. Indeed, the transfer of multiple categories of data may be provided, as described in more detail below with respect to FIG. 6.

Figure 6:
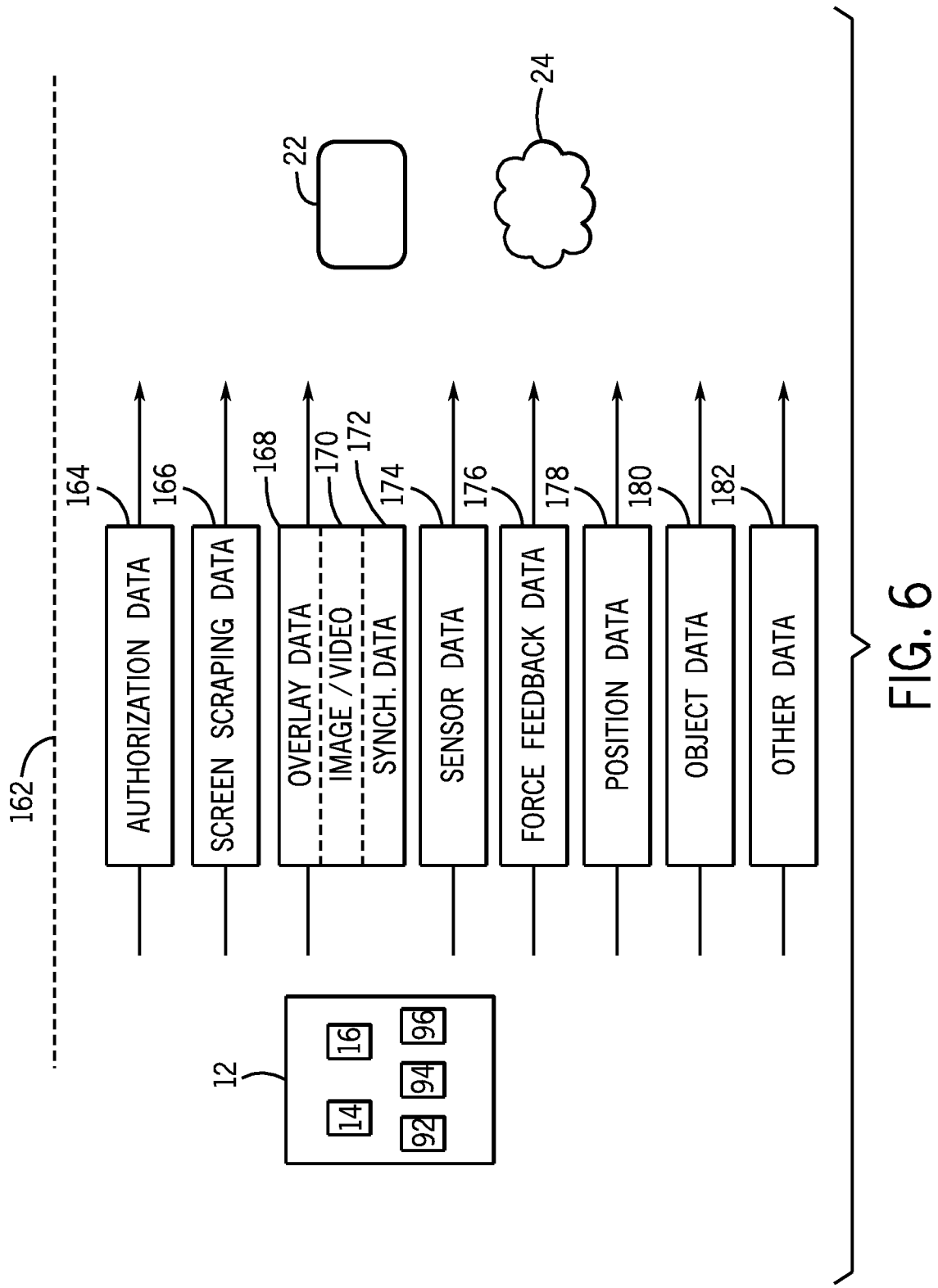
FIG. 6 is a block diagram of an embodiment of information flow through a wireless conduit.

FIG. 6 is a data flow diagram depicting an embodiment of the flow of various data categories originating from the NDT inspection devices 12 (e.g., devices 14, 16, 92, 94, 96) and transmitted to the mobile device 22 and/or the cloud 24. As mentioned above, the NDT inspection devices 12 may use a wireless conduit 162 to transmit the data. In one embodiment, the wireless conduit 112 may include WiFi (e.g., 802.11X), cellular conduits (e.g., HSPA, HSPA+, LTE, WiMax), NFC, Bluetooth™, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. Accordingly, an authorization data 164 may be used to provide any number of authorization or login information suitable to pair or otherwise authenticate the NDT inspection device 12 to the mobile device 22 and/or the cloud 24. Additionally, the wireless conduit 162 may dynamically compress data, depending on, for example, currently available bandwidth and latency. The mobile device 22 may then uncompress and display the data. Compression/decompression techniques may include H.261, H.263, H.264, moving picture experts group (MPEG), MPEG-1, MPEG-2, MPEG-3, MPEG-4, DivX, and so on.

In certain modalities (e.g., visual modalities), images and video may be communicated by using some or all of the NDT inspection devices 12. Other modalities may also send video, sensor data, and so on, related to or included in their respective screens. The NDT inspection device 12 may, in addition to capturing images, overlay certain data onto the image, resulting in a more informative view. For example, a borescope tip map may be overlaid on the video, showing an approximation of the disposition of a borescope tip during insertion so as to guide the operator 26 to more accurately position the borescope camera 126. The overlay tip map may include a grid having four quadrants, and the tip 136 disposition may be displayed as dot in any portion or position inside of the four quadrants. A variety of overlays may be provided, as described in more detail below, including measurement overlays, menu overlays, annotation overlays, and object identification overlays. The image and video data, such as the video 84, may then be displayed, with the overlays generally displayed on top of the image and video data.

In one embodiment, the overlays, image, and video data may be "screen scraped" from the screen 135 and communicated as screen scrapping data 166. The screen scrapping data 166 may then be displayed on the mobile device 22 and other display devices communicatively coupled to the cloud 24. Advantageously, the screen scrapping data 166 may be more easily displayed. Indeed, because pixels may include both the image or video and overlays in the same frame, the mobile device 22 may simply display the aforementioned pixels. However, providing the screen scraping data may merge both the images with the overlays, and it may be beneficial to separate the two (or more) data streams. For example, the separate data streams (e.g., image or video stream, overlay stream) may be transmitted approximately simultaneously, thus providing for faster data communications. Additionally, the data streams may be analyzed separately, thus improving data inspection and analysis.

Accordingly, in one embodiment, the image data and overlays may be separated into two or more data streams 168 and 170. The data stream 168 may include only overlays, while the data stream 170 may include images or video. In one embodiment, the images or video 170 may be synchronized with the overlays 168 by using a synchronization signal 172. For example, the synchronization signal may include timing data suitable to match a frame of the data stream 170 with one or more data items included in the overlay stream 168. In yet another embodiment, no synchronization data 172 data may be used. Instead, each frame or image 170 may include a unique ID, and this unique ID may be matched to one or more of the overlay data 168 and used to display the overlay data 168 and the image data 170 together.

The overlay data 168 may include a tip map overlay. For example, a grid having four squares (e.g., quadrant grid) may be displayed, along with a dot or circle representing a tip 136 position. This tip map may thus represent how the tip 136 is being inserted inside of an object. A first quadrant (top right) may represent the tip 136 being inserted into a top right corner looking down axially into the object, a second quadrant (top left) may represent the tip 136 being inserted into a left right corner looking down axially, a third quadrant (bottom left) may represent the tip 136 being inserted into a bottom left corner, and a fourth quadrant (bottom right) may represent the tip 136 being inserted into a bottom right corner. Accordingly, the borescope operator 26 may more easily guide insertion of the tip 136. In one embodiment, the tip map may indicate tip 136 position using x/y servo positions. For example, if a probe was laid out on a flat surface, pressing "up" on a physical joystick would result in the probe head moving up as well as the tip map indicating that the probe was in the up position. This is all relative as while inside an asset (for example a gas turbine), the probe itself will be rotated and the tip map may not have this understanding.

The overlay data 168 may also include measurement overlays. For example, measurement such as length, point to line, depth, area, multi-segment line, distance, skew, and circle gauge may be provided by enabling the user to overlay one or more cursor crosses (e.g., "+") on top of an image. In one embodiment a stereo probe measurement tip 136, or a shadow probe measurement tip 136 may be provided, suitable for measurements inside of objects, including 3D phase measurements, stereoscopic measurements and/or by projecting a shadow onto an object. By placing a plurality of cursor icons (e.g., cursor crosses) over an image, the measurements may be derived using stereoscopic techniques. For example, placing two cursors icons may provide for a linear point-to-point measurement (e.g., length). Placing three cursor icons may provide for a perpendicular distance from a point to a line (e.g., point to line). Placing four cursor icons may provide for a perpendicular distance between a surface (derived by using three cursors) and a point (the fourth cursor) above or below the surface (e.g., depth). Placing three or more cursors around a feature or defect may then give an approximate area of the surface contained inside the cursors. Placing three or more cursors may also enable a length of a multi-segment line following each cursor.

Likewise, by projecting a shadow, the measurements may be derived based on illumination and resulting shadows. Accordingly, by positioning the shadow across the measurement area, then placing two cursors as close as possible to the shadow at furthermost points of a desired measurement may result in the derivation of the distance between the points. Placing the shadow across the measurement area, and then placing cursors at edges (e.g., illuminated edges) of the desired measurement area approximately to the center of a horizontal shadow may result in a skew measurement, otherwise defined as a linear (point-to-point) measurement on a surface that is not perpendicular to the probe 14 view. This may be useful when a vertical shadow is not obtainable.

Similarly, positioning a shadow across the measurement area, and then placing one cursor on a raised surface and a second cursor on a recessed surface may result in the derivation of depth, or a distance between a surface and a point above or below the surface. Positioning the shadow near the measurement area, and then placing a circle (e.g., circle cursor of user selectable diameter, also referred to as circle gauge) close to the shadow and over a defect may then derive the approximate diameter, circumference, and/or area of the defect. 3D phase measurements may be obtained by using a single probe tip 136 to provide for 3D surface scans, and no tip change may be used. In effect, the 3D phase measurement may provide more accurate measurement "on-demand" by eliminating the need to change the probe tip to capture the measurement, streamlining the inspection process.

Overlay data 168 may also include annotation data. For example, text and graphics (e.g. arrow pointers, crosses, geometric shapes) may be overlaid on top of an image to annotate certain features, such as "surface crack." Additionally, audio may be captured by the NDT inspection device 12, and provided as an audio overlay. For example, a voice annotation, sounds of the equipment undergoing inspection, and so on, may be overlaid on an image or video as audio. The overlay data 168 received by the mobile device 22 and/or cloud 24 may then be rendered by a variety of techniques. For example, HTML5 or other markup languages may be used to display the overlay data 168. In one embodiment, the mobile device 22 and/or cloud 24 may provide for a first user interface different from a second user interface provided by the NDT device 12. Accordingly, the overlay data 168 may be simplified and only send basic information. For example, in the case of the tip map, the overlay data 168 may simply include X and Y data correlative to the location of the tip, and the first user interface may then use the X and Y data to visually display the tip on a grid.

Additionally sensor data 174 may be communicated. For example, data from the sensors 126, 140, and x-ray sensor data, eddy current sensor data, and the like may be communicated. In certain embodiments, the sensor data 174 may be synchronized with the overlay data 168, for example, overlay tip maps may be displayed alongside with temperature information, pressure information, flow information, clearance, and so on. Likewise, the sensor data 174 may be displayed alongside the image or video data 170.

In certain embodiments, force feedback or haptic feedback data 176 may be communicated. The force feedback data 176 may include, for example, data related to the borescope 14 tip 136 abutting or contacting against a structure, vibrations felt by the tip 136 or vibration sensors 126, force related to flows, temperatures, clearances, pressures, and the like. The mobile device 22 may include, for example, a tactile layer having fluid-filled microchannels, which, based on the force feedback data 176, may alter fluid pressure and/or redirect fluid in response. Indeed, the techniques describe herein, may provide for responses actuated by the mobile device 22 suitable for representing sensor data 174 and other data in the conduit 162 as tactile forces.

The NDT devices 12 may additionally communicate position data 178. For example, the position data 178 may include locations of the NDT devices 12 in relation to equipment 18, 104, and/or facilities 20, 106. For example, techniques such as indoor GPS, RFID, triangulation (e.g., WiFi triangulation, radio triangulation) may be used to determine the position 178 of the devices 12. Object data 180 may include data related to the object under inspection. For example, the object data 180 may include identifying information (e.g., serial numbers), observations on equipment condition, annotations (textual annotations, voice annotations), and so on. Other types of data 182 may be used, including but not limited to menu-driven inspection or menu directed inspection data, which when used, provides a set of pre-defined "tags" that can be applied as text annotations and metadata. These tags may include location information (e.g., $1^{st}$ stage HP compressor) or indications (e.g., foreign object damage) related to the object undergoing inspection. Other data 182 may additionally include remote file system data, in which the mobile device 22 may view and manipulate files and file constructs (e.g., folders, subfolders) of data located in the memory 25 of the NDT inspection device 12, or in media coupled to the NDT device 12 or disposed inside the NDT device 12, such as secure digital (SD) cards, thumb drives, USB hard drives, and the like. Accordingly, files may be transferred to the mobile device 22 and cloud 24, edited and transferred back into the memory 25. By communicating the data 164-182 to the mobile device 22 and the cloud 24, the techniques described herein may enable a faster and more efficient process 150. By communicating the data 164-182 to the mobile device 22 and the cloud 24, the techniques described herein may enable a faster and more efficient process 150. Indeed, the transfer of multiple categories of data may be provided, as described in more detail below with respect to FIGS. 7-10.

Figure 7:
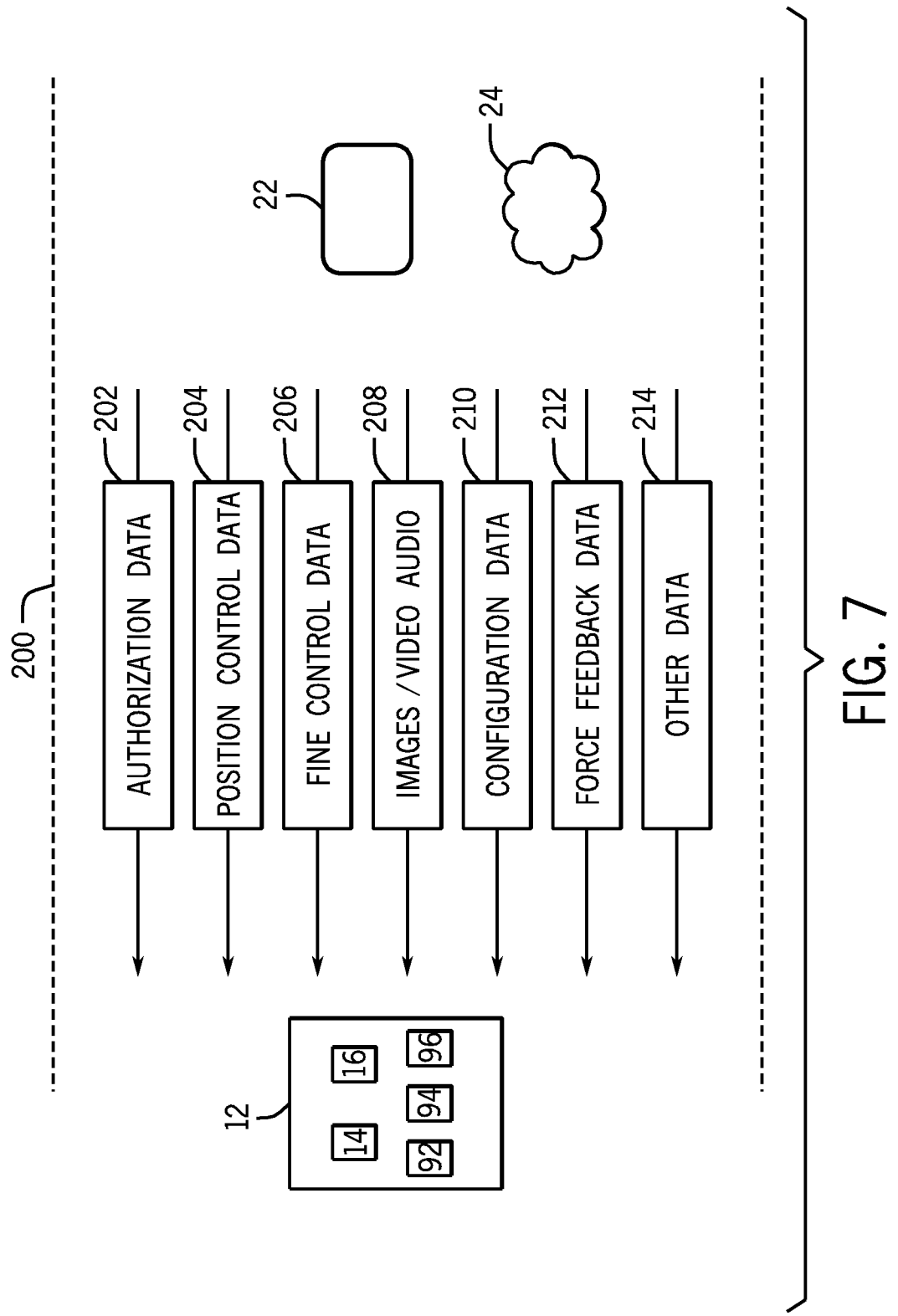
FIG. 7 is a block diagram of an embodiment of information flow through a wireless conduit of information useful in remote control of the NDT inspection system of FIG. 1.

Turning now to FIG. 7, the figure is a data flow diagram illustrating an embodiment of the flow of various data categories originating from the mobile device 22, devices inside the cloud 24, and/or devices communicatively connected to the cloud 24 (e.g., computing system 29) and directed, for example, towards the NDT inspection devices 12 (e.g., borescope 14, PTZ camera 16, eddy current inspection device 92, ultrasonic flaw detector 94, digital radiography device 96). Such data may include control data suitable for controlling the NDT device. As described herein, the control of the NDT inspection devices 12 includes both control of positioning apparatus, such as the articulating section 122 of the borescope 14, apparatus used to pan, tilt, and zoom the PTZ camera 16, as well as the remote control of file systems in the NDT devices 12, screen(s) included in the NDT devices 12, and the setting of parameters used to operate or to configure the NDT devices 12, as described in more detail below.

In the depicted embodiment, a wireless conduit 200 may be used to communicate the data (e.g. control data) to the NDT devices 12. Similar to the conduit 162, the wireless conduit, in certain embodiments, may include WiFi (e.g., 802.11X), cellular conduits (e.g., HSPA, HSPA+, LTE, WiMax), NFC, Bluetooth™, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. It is to be noted that, in other embodiments, wired conduits may be used alternative to or in lieu of the wireless conduits 162, 200.

Authorization data 202 may be communicated, and used, for example, in conjunction with the authorization data 164 to enable secure access to the NDT devices 12. A variety of secure authentication techniques may be used, including but not limited to login/password combinations, maintaining a list of secure MAC addresses, challenge-response authentication between two or more of the devices 12, 22, and cloud 24, secure NFC authentication, using a third-party authentication server (e.g., by using certificate authentication, key exchange authentication), and so on.

Position control data 204 may additionally be communicated, useful to move or otherwise position components of the NDT devices 12. Indeed, certain components of the NDT devices 12 may be physically moved remotely by using, for example, a virtual joystick. Any number of systems (e.g., mobile devices 22, computing systems 29, web-based virtual controllers), such as devices connected to the NDT devices 12 locally (e.g., WiFi, Bluetooth™) and/or via the cloud 24, may be used to remotely communicate the data 204 and used to remotely position components of the NDT devices 12.

Advantageously, a variety of remote operations, training, and collaboration may be enabled. For example, an expert operator may train a new borescope operator on the job. The new borescope operator may hold the borescope 14 and observe while the expert operator controls the borescope 14 by using the mobile device 22. The expert operator may then point out tip control techniques, relate what type of observations are correlative to corrosion, show how to make annotations, and so on. In other cases, the expert operator may be located at a different geographic location and may collaborate and/or train the new borescope operator by the use of VOIP, whiteboarding, and the like, or may use the mobile device 22 to perform a full inspection remotely. In another training example, the new borescope operator may be using the mobile device 22 and/or borescope 14, and receive training from remote locations, such as web-based locations. For example, the screen 137 of the mobile device 22 may be portioned into multiple viewing areas (e.g., "splitscreens") so that one viewing area shows borescope 14 images or video while a second viewing area shows a training video, and a third area shows an online equipment manual procured wirelessly. Indeed, the boresecope 14 may receive data, including targeted multimedia inspection data from external sources (e.g., mobile device 22, cloud 24, computing system 29).

Additionally, fine control data 206 may be communicated. For example, "jogging" data suitable for moving the borescope's articulating section 122 and/or the PTZ camera 16 at smaller increments than the position control data 204. More specifically, the fine control data 206 may include a step to move (e.g., 0.5 mm, between 0.05 mm and 1 cm or more), and a number of steps to move (e.g., 1, 2, 3, 4, 5 or more). Accordingly, components of the NDT device 12 may be more precisely disposed to better observe certain features undergoing inspection. The position control data 204 and fine control data 206 may be produced by virtual controllers or physical controllers communicatively connected to the NDT devices 12.

Images, video, text, and/or audio data 208 may be additionally communicated. For example, the mobile device 22, the cloud 24, and/or devices coupled to the cloud (e.g., computing system 29) may send images and/or video, as well as overlay annotations useful in illustrating to the borescope operator certain features to inspect further, along with audio detailing explanations of how to proceed with the inspection. In certain embodiments, the data 208 may be training data useful in detailing inspection procedures. In other embodiment, the data 208 may include data transmitted from experts, detailing instructions on how to more thoroughly inspect certain equipment. In yet another embodiment, the data 208 may include data sent through automated entities (e.g., expert systems, fuzzy logic systems, neural network systems, state vector machines) based on received data from FIG. 6 useful in directing and/or focusing the inspection after automatically analyzing the received data.

Configuration data 210 may also be communicated. For example data used to update file systems included in the NDT devices 12, to reprogram the NDT devices 12, to set parameters useful in operating the NDT devices 12, and/or to reconfigure electronic components of the device 12 (e.g., flash upgrade) may be sent to the NDT inspection devices 12 remotely. Indeed, programming and parameter-setting may be done remotely, thus providing for techniques to more easily maintain the NDT devices up to date, and to improve device operations. It is to be understood that different NDT devices 12 may use different parameter sets. As a non-limiting example only, some parameters, e.g., used during operations of the NDT device 12 and useful to remote control the NDT devices 12 may include parameters for starting acquisition of data, stopping acquisition of data, saving a file, naming or renaming a file, adjusting a gain, adjusting a time base, compensating for lift off—zeroing signal during eddy current inspection, adjusting phase rotation, adjusting persistence, balancing a probe, adjusting gate (e.g., amplitude adjustment, position adjustment), adjusting color palette—soft gain, changing signal rectification, changing pulser filter, zooming in and out, adjusting a pulse width, adjusting a data filter (e.g., bandwidth), adjusting pulse repetition frequency, adjusting sweep angle start/stop, adjusting sweep angle increment, turning channels on/off, freezing data, clearing/erasing data, adjusting span, adjusting filters, changing spot positions, changing display types (e.g., spot display, timebase display, waterfall display), and/or changing channel views.

In one embodiment, client-server techniques, such as virtual network computing (VNC), remote desktop protocol (RDP), desktop sharing, among others, may be used to send configuration data 210 and receive data correlative with screen control of the NDT devices 12. Likewise, remote file system control may be provided by using techniques such as secure file transfer protocol (ftp), ftp over secure shell (SSH), remote file sharing (RFS), and/or distributed file systems (e.g., using the cloud 24 to store and retrieve files through the NDT devices 12). Files may be added, renamed, deleted, and/or updated. Likewise, file folders and other file storage structures may be similarly renamed, deleted, and/or updated.

Figure 8:
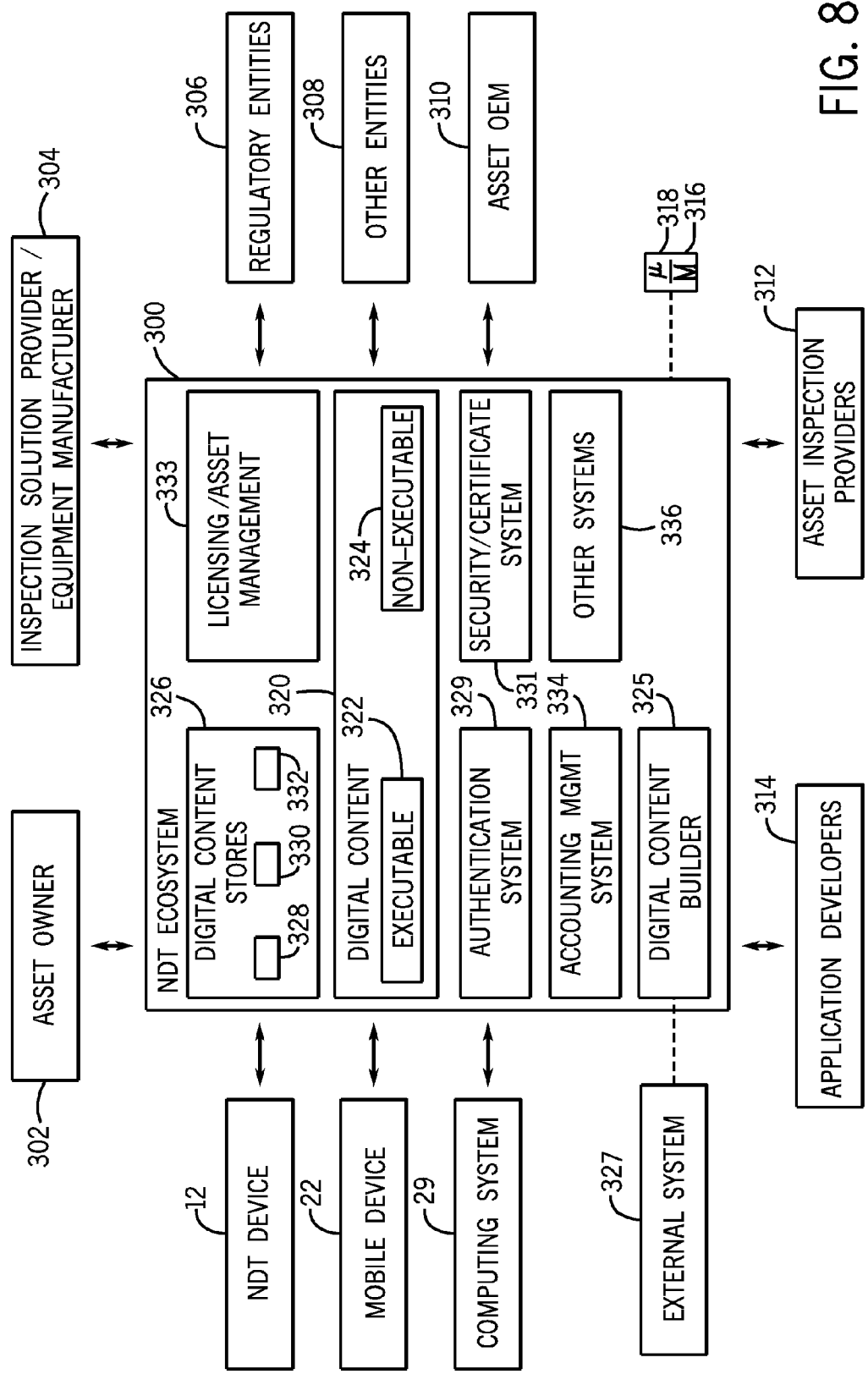
FIG. 8 is a block diagram of an embodiment of an NDT ecosystem.

Force feedback data 212 may additionally be communicated. For example, a more forceful push onto the mobile device's 22 touchscreen may translate into data 212 useful in moving the borescope's articulating section 122 more quickly. Likewise, a haptic controller may be coupled to the computing device 29 and provide the force feedback data. The more force applied, the faster the correlative movement of components such as the articulating section 122 of the borescope 14. It is to be noted that force feedback data 212 may be provided by other devices, such as the physical joystick 131, a virtual joystick, haptic controllers wirelessly coupled to the NDT devices 12, including controllers coupled through the cloud 24 or mobile device 22 (e.g., when the mobile device 22 is providing for WAP functionality). Other data 214 may include updated digital manuals or help manuals useful in operating the NDT devices 12, manuals relating to the equipment (e.g., turbomachinery 18, aircraft 54) undergoing inspection, and so on. Accordingly, the wireless conduit 200 would be used to communicate and to change or otherwise modify NDT device 12 information, such as borescope-specific information including but not limited to measurement information (cursor placement, measurements, stereo matches), MDI information (current stage, asset information, reference material), current menu selections, tip temperatures/pressures, tip orientation (tip map, artificial horizon), 3-dimensional phase measurement (3DPM) range indication, text annotation, and so on. Software control applications may render native graphics with touchscreen buttons or softkey labels as described in more detail below, and if appropriate, accept user input. Hard physical buttons with either fixed or dynamic functionality can also be used to accept input. It is to be noted that the NDT device 12 may be controlled by a first entity (or more than one remote entities) at the same time as the NDT device 12 is used by a second entity. Indeed, the control embodiments described herein enable multiple parties to control the device at the same time, including multiple remote parties. FIG. 8 is illustrative of an embodiment of a NDT ecosystem 300 useful in providing for a collaborative environment between, for example, the NDT device 12, the mobile device 22, the computing system 29, an asset owner 302, an inspection solution provider/equipment manufacturer 304, regulatory entities 306, other entities 308, an asset original equipment manufacturer (OEM) 310, asset inspection providers 312, and/or application developers 314. The NDT ecosystem 300, or portions of the NDT ecosystem 300, may be implemented by executable computer instructions stored in a memory 316 and executed by a processor 318. The memory 316 and processor 318 may be included in a system inside the cloud 24 or connected to the cloud 24, including but not limited to computing servers, virtual machines, load balanced computing devices, and the like.

In the depicted embodiment, the asset owner 302 may include the owner or lessee of equipment and facility assets, such as turbomachinery 18, aircraft 104, and/or facilities 20, 106. The inspection solution provider 304 may include a company or entity that develops software and hardware (e.g., manufactures equipment such as the NDT devices 12) useful in performing the process 150 or components of the process 150, including the inspection 154. Regulatory entities 306 may include state and federal agencies that regulate all or portions of the process 150. Other entities 308 may include entities providing cloud computing services 24, such as entities providing connectivity services (e.g., wired and/or wireless connectivity), backend computing services (e.g., cloud based computer processing services, grid computing services, cluster computing services, supercomputing services, and/or cloud based storage services). The asset OEM 310 includes the manufacturer of the aforementioned equipment and facilities assets. The asset inspection providers 312 include entities that provide, for example, personnel and equipment used in the inspection 154.

Application developers 314 include any entity, including but not limited to the aforementioned entities 302, 304, 306, 308, 310, 312 that may write digital content 320, including computer executable content 322 (e.g., mobile applications, web applications, desktop applications, device drivers, firmware, configuration files, and configuration related files) and/or non-executable content 324 (e.g., equipment manuals, inspection procedures, training procedures, regulatory documents, regulatory procedures, audio, video, text, multimedia, interactive computer simulations, and so on). The digital content may be stored in a repository (e.g., database) included in the NDT ecosystem 300, and used, executed, and/or displayed by the devices 12, 22, and/or 29. Additionally or alternatively, the digital content 320 may reside in the cloud 24 (or systems coupled to the cloud 24) and the NDT devices 12 may use the digital content 320 in the cloud 24 (or in system coupled to the cloud 24). That is, the digital content 320 may reside in the cloud 24 and the NDT devices 12 may connect and execute, display, or otherwise use the content 320 by using the cloud 24. The applications may include applications executable by the NDT device 12, the mobile device 22, the computing system 19, executable in the cloud 24 or a combination thereof. Likewise, non-executable content 324 may be viewable by using the NDT device 12, the mobile device 22, and the computing system 19. Accordingly, collaboration by using the NDT ecosystem 300 may involve inception of an idea for the NDT digital content 320, and the creation, distribution, purchase, management and revenue sharing of the NDT digital content 320.

For example, the inspection solution provider 304 may create digital content 320 (e.g., applications) and hardware solutions to support the digital content 320. The applications (and other digital content 320) may be created and tested by using a digital content builder 325, described in more detail below. These applications may then be executed on the NDT devices 12, mobile device 22, and/or computing system 29 to support the process 150, including the planning 152, inspection 154, analysis 156, reporting 158, and/or sharing 160. It is to be noted that the digital content 320, including applications, may be constructed by any of the entities 302, 304, 306, 308, 310, 312, and 314, by third parties, and so on, and distributed, for example, by using digital content stores 326. The digital content stores 326 may include public stores 328, private stores 330, and other stores 332. The public stores 328 may include stores accessible by all entities 302, 304, 306, 308, 310, 312, and 314, while the private stores 330 may include stores that are accessible only to a subset of each of the entities 302, 304, 306, 308, 310, 312, and 314, of a subset of all of the entities 302, 304, 306, 308, 310, 312, and 314 (e.g., entities or others vetted by the store creator). The other stores 332 may include hybrid stores (e.g., semi-private stores) where certain items are sold to the public while other items are sold only to vetted customers. For example, all public content may be sold, and certain private content an entity is granted access to may also be sold. Other stores 332 may additionally or alternatively include stores that cater to entities that have received governmental approval to buy and sell government-restricted items, such as export control items. By providing for the creation and distribution of a variety of digital content 320 by entities having a variety of expertise, the NDT ecosystem 300 may provide for enhanced collaboration and a more efficient process 150.

Continuing with FIG. 8, the digital content 320 may additionally include certain platform capabilities, such as application programming interfaces (APIs), interfaces to data analysis services, hardware interfaces, (e.g., software interfaces to the hardware of the NDT devices 12), and the like. Similar platform capabilities may be alternatively or additionally provided by the other systems 36 and used to provide services such as data storage and data analysis services. The inspection solution provider 304 may also provide techniques suitable for upgrading platform capabilities, for example, of the devices 12, 22, 24 either by using software, or by using certain hardware (e.g., WIFI modules used to retrofit previous models of the NDT devices 12), or a combination thereof. For example, the inspection solution provider 304 may create software applications and other content suitable for use, execution, and/or display in the devices 12, 22, and 29, and place the content, for example, in the digital stores 326 or in other distribution channels. Other techniques, including automatic updating of digital content on NDT devices 12, the management of software and hardware assets, the more efficient purchasing and revenue sharing of digital content 320, and improved techniques for maintaining user profiles, may be provided by using the techniques described herein, such as the NDT ecosystem 300.

The application/content developers 314 may create the applications and other digital content 320 (e.g., firmware, platform APIs, platform support software) executable or displayable by the NDT devices 12 using, for example, the digital content builder software 325. Indeed, a role of the application developers 314 may include building NDT applications for specific NDT inspections and/or NDT devices 12. In certain embodiments, the NDT applications may be developed using the digital content builder 325. The digital content building software 325 may include language compilers, interpreters, emulators (e.g., NDT device 12 emulators), debugging features, graphical user interface (GUI) builders, database connectivity builders, and the like, useful in creating the executable content 322 and the non-executable content 324. Additionally, the digital content building software 325 may include tie-ins to external systems 327, including knowledge based systems (e.g., expert systems, expert reasoning systems, fuzzy logic systems, heuristic reasoning systems), which may include "canned" human expert knowledge and experience useful in developing the digital content 320.

Once the digital content 320 has been developed, including applications, training manuals, user manuals, and other associated documents, the application developers may upload the digital content for distribution by the digital stores 326. In the depicted embodiment, an automated authentication system 329 may check for the authenticity of the digital content 320 and may ensure that the digital content 320 conforms to the publishing guidelines published, for example, by the inspection solution provider 304. Additionally, the digital content 320 may be processed by a security/certificate system 331 suitable, for example, for creating digital certificates, for interacting with third party certificate authorities, for encrypting the digital content 320, and more generally, for providing secure access to the NDT ecosystem 300.

As mentioned above, all of the entities 302, 304, 306, 308, 310, 312, and 314 may create digital content 320. For example, the asset OEM 310 or other parties can publish inspection manuals, inspection procedures, training manuals, training procedures, multimedia content, interactive computer simulations, video, software applications, and the like, through the NDT Application ecosystem 300. Indeed, all entities 302, 304, 306, 308, 310, 312, and 314 may create and publish similar digital content. Accordingly, the asset owner 302 and/or asset inspection providers 312 may purchase the digital content 320 created by the asset OEM 310, inspection solution provider 304, regulatory entities 306, and/or other entities 308, and "subscribe" to updated content 320, as described in more detail below, to receive updated content 320. The asset inspection providers 312 may create digital content 320, such as inspection-of-assets training content, or may sell inspection services through the digital stores 326. Likewise, application developers 314 may sell a variety of software applications supporting the process 150 or portions of the process 150 and executable by the devices 12, 22, 29. All digital content 320 created by the entities 302, 304, 306, 308, 310, 312, and 314 may be managed, for example by using a licensing/asset management system 322, to provide for more efficient updates, deployment, and the like, of the digital content 320, and to manage licensing of the content 320, including digital rights management (DRM). Other systems 336 may include systems useful in supporting cloud computing 24, such as cloud based storage systems, scalable processing systems, data analysis systems, databases, virtual machines, load balancers, and the like.

Hardware may also be purchased by using the digital stores 326, such as NDT 12 device accessories, hardware platform upgrades for the NDT devices 12, and the like. By providing for an NDT business platform, the NDT ecosystem 300 may enable revenue sharing between the entities 302, 304, 306, 308, 310, 312, and 314. For example the application developers 314, the asset OEM 310, and the inspection solution provider 304 may enter into a revenue sharing policy. An accounting management system 334 may be additionally provided, useful to manage credits, debits, and more generally, accounting information related to the NDT ecosystem 300. For example, each of the entities 302, 304, 306, 308, 310, 312, and 314, and other users, may keep one or more store 326 accounts managed by the system 334. Sales and purchases related to each entity 302, 304, 306, 308, 310, 312, and 314, and other users, may then be credited or debited accordingly. In a related manner, the licensing/asset management system 333 may keep entity 302, 304, 306, 308, 310, 312, and 314 accounts useful in managing the assets, such as the NDT devices 12 and digital content 320 associated with the NDT devices 12. For example, once digital content 320 is purchased by the inspection provider 312, the inspection provider 312 can log into the licensing/asset management system 333 to view software assets (e.g., digital content 320) and correlative hardware assets (e.g., equipment to be inspected, NDT devices 12) listed in their account, to create links between software and hardware assets, update links, delete links, and so on, as described in more detail below. Accordingly, the NDT device 12, the mobile device 22, and the computing system 29 may include a digital rights management (DRM) component which may be used to enforce licenses downloaded with the digital content 320 so as to enable runtime licensing of the digital content 320.

During the initiation of an inspection 154 that is using the NDT device 12, the NDT device 12 may then connect to the NDT ecosystem 300 and all the executable content 322 (e.g., applications, configuration files, configuration related files) along with corresponding non-executable content 324 (e.g., manuals, historical inspection results, analysis reports, training multimedia) may be automatically downloaded and the device 12 may be configured to use the downloaded content during the inspection 154. For example, the device 12 may receive or scan the tail number of a specific aircraft 104 and all digital content 320 related to that model of aircraft 104, components of the aircraft 104 (e.g., engines, airframe), historical logs of the specific tail number, analysis performed on the tail number, maintenance logs, operational logs (e.g., describing equipment operations and time) and so on, may be automatically downloaded onto the NDT device 12 to configure the NDT device 12 for inspection of the specific tail number. Indeed, equipment, including specific equipment identified by serial number, tail number, and so on, may be used to download a custom package of digital content 320, including inspection application software configured to be executed by the NDT devices 12, targeted to inspect the specific equipment. Accordingly, a more efficient and focused inspection may be realized. Indeed, by using the NDT ecosystem 300, a variety of processes suitable to enable, for example, more efficient purchasing, license management, deployment of NDT devices 12, and maintenance/updating may be provided, as described in more detail below. It is to be noted that all of the functionality provided by the NDT ecosystem 300 may be contained in only one component, in or more of the components of the NDT ecosystem 330, or in any combination of components of the NDT ecosystem 330. For example, in certain embodiments, the digital stores 326 may include the licensing/asset management system 333, the authentication system 329, the security/certificate system 331, the accounting management system 334, combinations thereof, or any of the capabilities provided by the systems.

Figure 9:
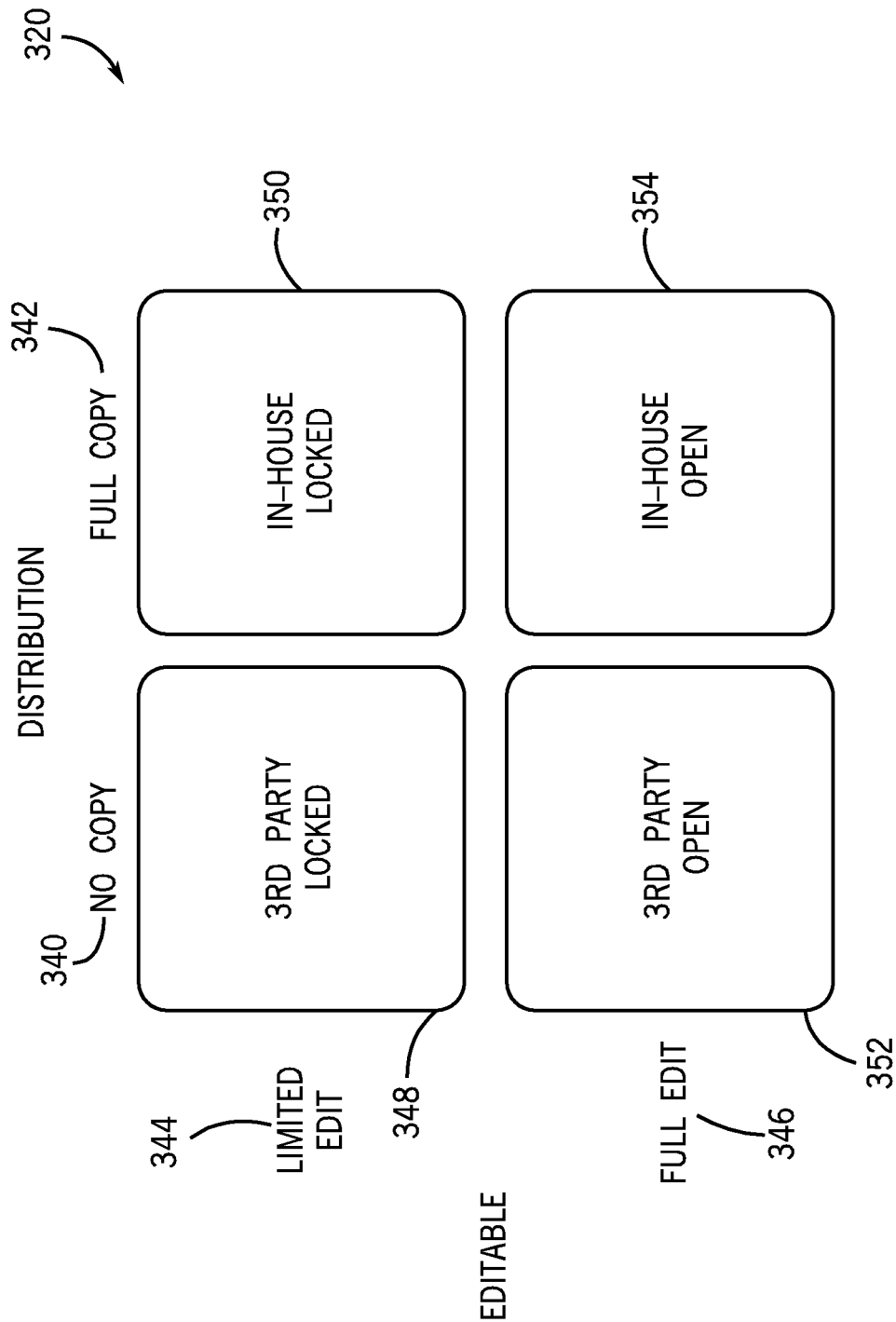
FIG. 9 is an illustration of embodiments of digital content managed by the NDT ecosystem of FIG. 8.

FIG. 9 depicts an embodiment of digital content 320 that may be distributed by using the NDT ecosystem 300. In the depicted embodiment, the licensing/asset management system 333 may support at least two categories of distribution of the content 320, a "no copy" category 340, where copying of the digital content 320 is not allowed, and a "full copy" category 342 where copying of the digital content is fully allowed. Likewise, the licensing/asset management system 333 may support at least two categories of editing of the content 320. For example, a "limited edit" category may be supported, where editing of some of the content (or no editing) by non-authors is enforced. A "full edit" category 346 may be used when full editing of the content 320 by non-authors is allowed. Accordingly, the digital content 320 may include a "$3^{rd}$ party locked" digital content 348 where no copying and limited editing is enforced, and an "in-house locked" digital content 350 where full copying but limited editing is allowed. Likewise, a "$3^{rd}$ party open" digital content 352 may be provided, where full editing but no copying is allowed, and an "in-house open" digital content 354 where full editing and full copying is allowed. DRM and other techniques may be used by the licensing/asset management system 333 to enforce the categories 340, 342, 344, and 346. The content may be distributed by using the digital stores 326 and/or by other distribution channels in the NDT ecosystem 300 (e.g., file transfer protocol [ftp] servers, web servers, cloud-based storage drives). Content 320 may also be transmitted using media devices such as ssd (solid state devices), thumbdrives, wired conduits between NDT instruments to mobile device (or laptop/PC), etc.

Accordingly, customers may search for online digital content, using, for example, filtered searches, contextual searches, search-as-you-type, Boolean searches, and so on, to find the digital content 320 provided by the digital stores 326 and/or the other distribution channels. Once desired content 320 is found, the users (e.g., entities 302, 304, 306, 308, 310, 312, 314, and others) may pay for digital content by using the digital stores 326, with account information managed by the accounting management system 334. Multiple payment options may be supported, including credit cards, debit cards, purchase orders, coupons, bank transfers, online payments (e.g., PayPal™, BitCoin), and the like. Multiple license types may be supported, including time-based licenses (e.g., annual licenses that expire once a year, perpetual licenses, monthly licenses, weekly licenses), single use licenses or per use licenses (expire after a single use of the digital content 320 and can be renewed for another use), date driven licenses (e.g., 30 day trial licenses), volume-based licenses (e.g., similar to cell phone plan where charges are per time of use and/or per amount of data used) and so on, by the licensing/asset management system 333, and DRM may be enforced. Multiple seats of the same digital content 320 may also be purchased, suitable for use by more than one user and/or NDT device 12, mobile device 22, and computing device 29.

The customers may then edit some of the purchased content, such as inspection procedures, or may create new content, both for distribution through the NDT ecosystem 300 (e.g., by using the digital stores 326) as mentioned above with respect to FIG. 9. In certain cases, the customers may create private stores 330 where only users vetted by the customer may buy digital content 320 (and hardware or services). In other cases, public stores 328 may be used or created, where the digital content (and hardware or services) may be sold to the public. Other stores 336 may be used to sell, for example, restricted goods and services, such as export controlled goods and services.

Accounts for customer assets (e.g., software assets like the content 320 and associated hardware like the NDT device 12) may be provided by using the licensing/asset management system 333. Multiple devices 12, 22, and/or 29 may be managed for a given single account. One-button synchronization/deployment may be provided, as described in more detail below, suitable for synchronizing the devices 12, 22, and/or 29 with the purchased digital content 320. Accordingly, the devices 12, 22, and/or 29 may be kept up to date on NDT content 320, including content delivered across geographic regions and in multiple languages.

Figure 10:
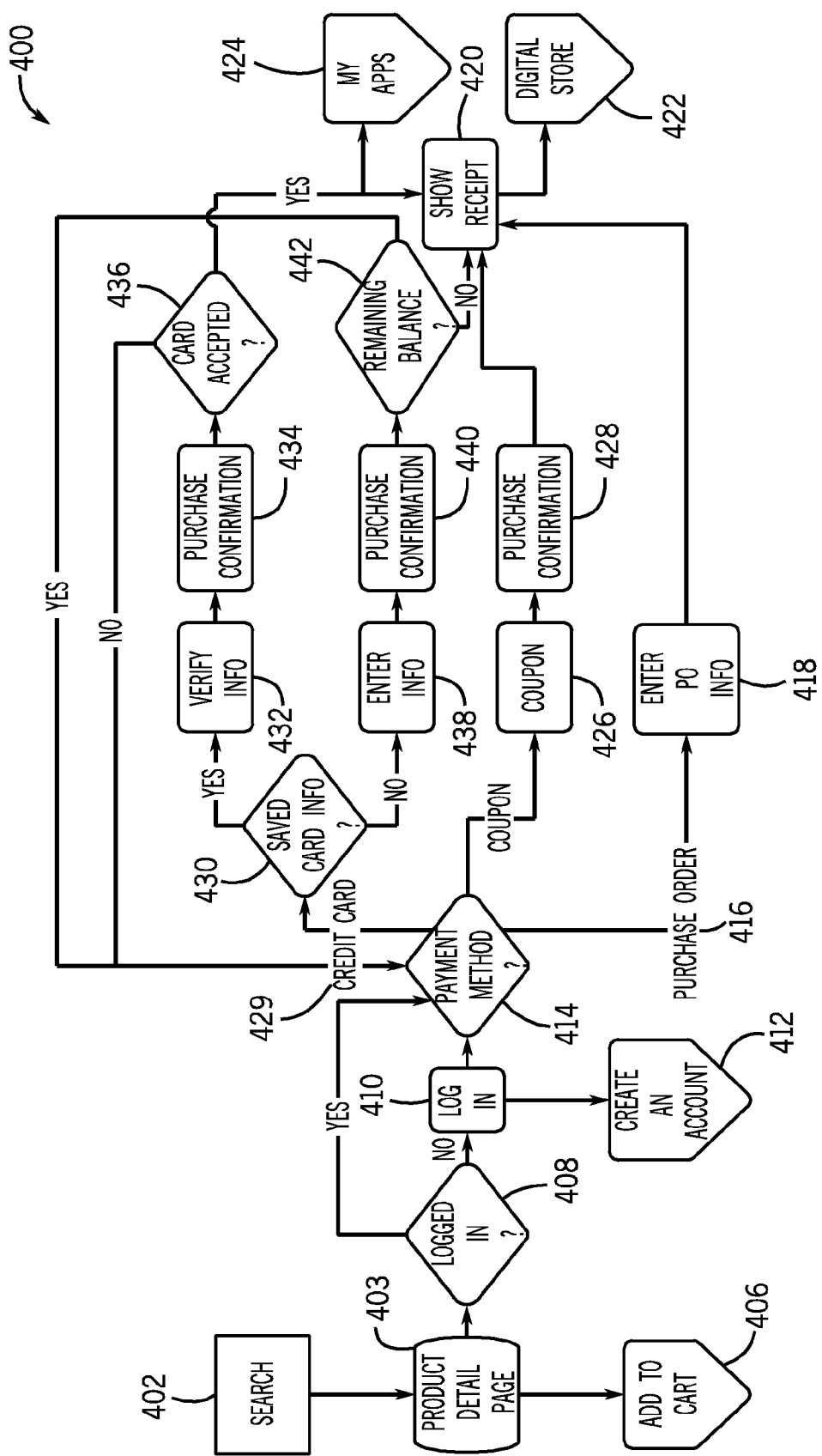
FIG. 10 is a flowchart of an embodiment of a process for using the NDT ecosystem of FIG. 8 to purchase NDT items.

Turning now to FIG. 10, the figure is a flowchart illustrating an embodiment of a process 400 suitable for purchasing goods and services by using the NDT stores 326. The process 400 may be implemented by using computer executable instructions stored in the memory 316 and executed by the processor 318. In the depicted embodiment, the user (e.g., 302, 304, 306, 308, 310, 312, and/or 314) may search (block 402) for NDT goods and services (e.g., digital content 320) and be directed to a product detail page 403 based on the search. The search (block 402) may be performed by using the NDT devices 12, the mobile device 22, the computing system 29, or a combination thereof. The user may then add a product to an online cart (block 406). The process 400 may then determine if the user is logged in (decision 408). If the user is not logged in, the user may then log in (block 410). The user may then create an account (block 412). Once the user is logged in, a payment method may be determined (decision 414). If the payment method is a purchase order 416, the user may then enter a purchase order (PO) information (block 418), the process 400 may then show a receipt (block 420), and subsequently enable download (block 422) of digital content 320 by using the digital stores 326 and add application content information to a "My Apps" system (block 424), including account information. License purchasing may be similarly added to a "My Wallet" system. It is to be understood that system such as "My Apps" and "My Wallet" can be combined into a single system and provided by any single component (e.g., digital stores 326) or combination of components of the NDT ecosystem 300.

If the payment method is determined (decision 414) to include coupons 426, the process 400 may then ask for purchase confirmation (block 428). Once confirmed, the receipt may be shown (block 420), and downloads (block 422) and/or updates to "My Apps" (block 424) may be provided. If the payment method is determined (decision 414) to include a credit card 429, the process 400 may determine (decision 430) if credit card 429 information has been saved. If information has been saved, the process 400 may then enable the verification of the information (block 432), such as address, expiration date, and the like, and may then ask for purchase confirmation (block 434). If the card information is accepted (decision 436), the receipt may be shown (block 420), and downloads (block 422) and/or updates to "My Apps" (block 424) may be provided. If the card is not accepted (decision 436), the process 400 may iterate back to decision 414 and ask for payment method.

If the card information is not saved (decision 430) the user may enter credit card information (block 438), such as billing address, names, dates, security numbers, and the like. The process 400 may then ask for purchase confirmation (block 440). If it is determined that there is a remaining balance (decision 442), the process 400 may iterate to decision 414 and ask for a payment method. If there is no balance, the process 400 may show the receipt (block 420), and downloads (block 422) and/or updates to "My Apps" (block 424) may be provided. Accordingly, various payment methods may be used to purchase goods and services, including digital content 320 in the online stores 326.

Figure 11:
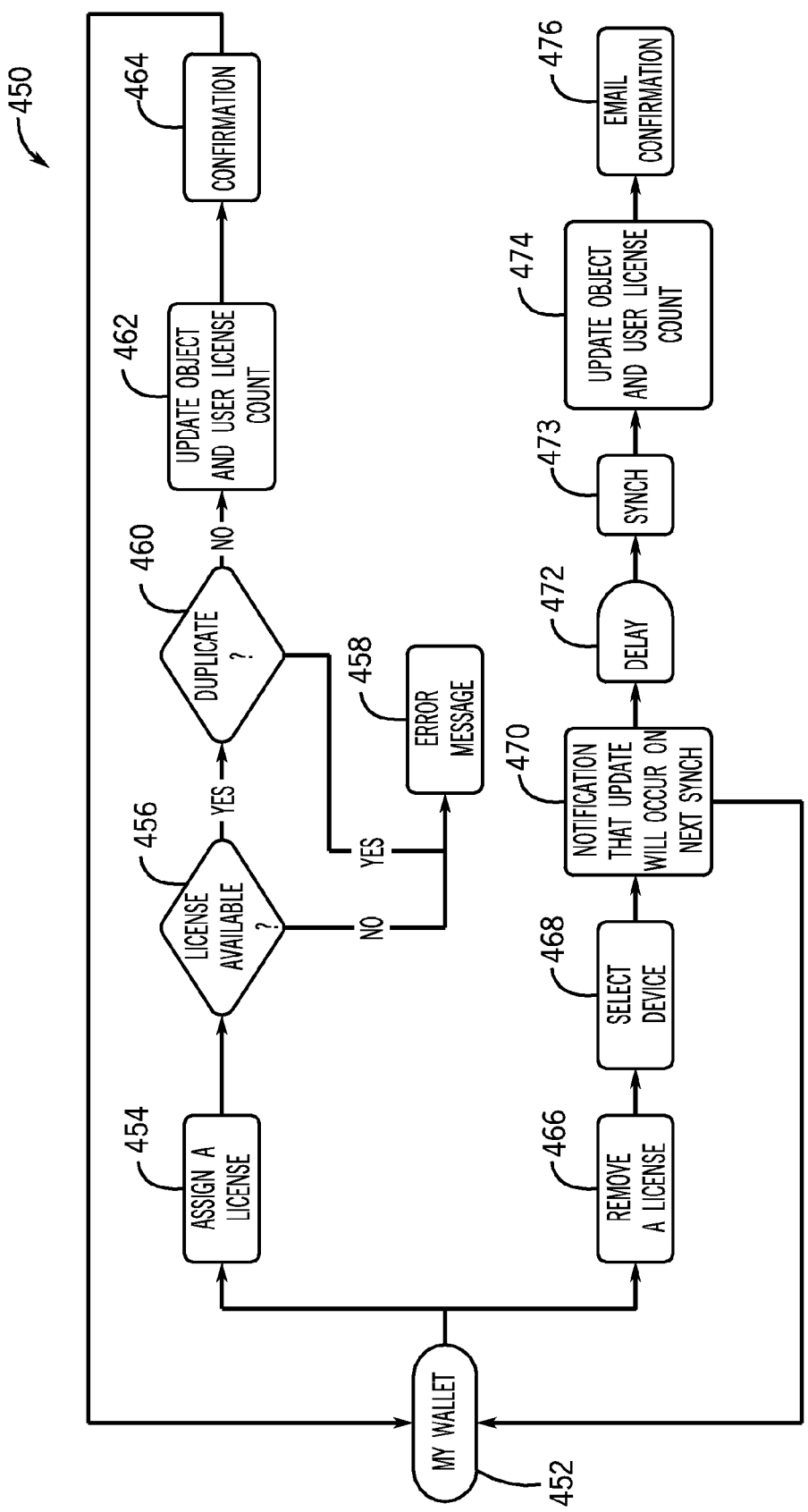
FIG. 11 is a flowchart of an embodiment of a process for using the NDT ecosystem of FIG. 8 to add or remove licenses.

FIG. 11 is a flowchart illustrating an embodiment of a process 450 suitable for using the licensing/asset management system 333 to assign and/or remove licenses. The process 450 may be implemented by using computer executable instructions stored in the memory 316 and executed by the processor 318. In the depicted embodiment, the user may log in to a "My Wallet" system 452. The system 452 may include purchased licenses, such as licenses to use certain digital content 320 in the NDT devices 12, the mobile device 22, and/or the computing system 29. The user (e.g., 302, 304, 306, 308, 310, 312, and 314) may use the system 452 to assign a license (block 454), for example, to a desired NDT device 12, mobile device 22, computing system 29, and/or to a user generally. However, if it is determined (decision 456) that no licenses are available, the process 450 may issue an error message (block 458). If licenses are available (decision 456) but it is determined that there are duplicate licenses (decision 460), the process 450 may issue an error message (block 458).

If it is determined (decision 460) that no duplicates exists, the process 450 may update (block 462) a device 12, 22, and/or 29 object and decrement a count of user licenses. The object may be a virtual or online representation of a physical device 12, 22, and/or 29 which may be used to synchronize content 320 with the corresponding device 12, 22, and/or 29. The process 450 may then issue a confirmation (block 464) of the allocation of the license, for example, via email.

To remove a license (block 466) that has been allocated to a physical device 12, 22, and/or 29, the process 450 may select, e.g., via user input, the device (block 468), for example, from a list of devices kept by the "My Wallet" system 452. The process 450 may then notify (block 470) the user that the update (e.g., removal of the license) may occur in the next synchronization, described in more detail in FIG. 12. There may be a delay (block 472) while the synchronization (block 473) occurs. After synchronization (block 473), the process 450 may update (block 474) the object associated with the physical device 12, 22, and/or 29, increment a license count, and may then issue a confirmation (block 476) of the removal of the license, for example, via email. Accordingly, licenses may be assigned or de-assigned to any of the devices 12, 22, and/or 29. The license may be used to manage execution rights, use rights, display rights, or a combination thereof. For example, execution rights may include the right to execute content in the devices 12, 22, 29, or in the cloud 24. The use rights may include rights provided via copyright (e.g. right to copy content 320 and to create derivative works of content 320) rights to publish content 320, sell content 320, access computing systems hosting content 320, reverse engineer content 320, rights based on access control of content 320 (e.g., DRM rights), and so on. The licensing may include licenses stored in the cloud 24 and/or in the devices 12, 22, 29. When stored in the cloud 24, the devices 12, 22, 29 may, for example, check with the cloud-based license for any restrictions when executing, using, and/or displaying any content 320.

Figure 12:
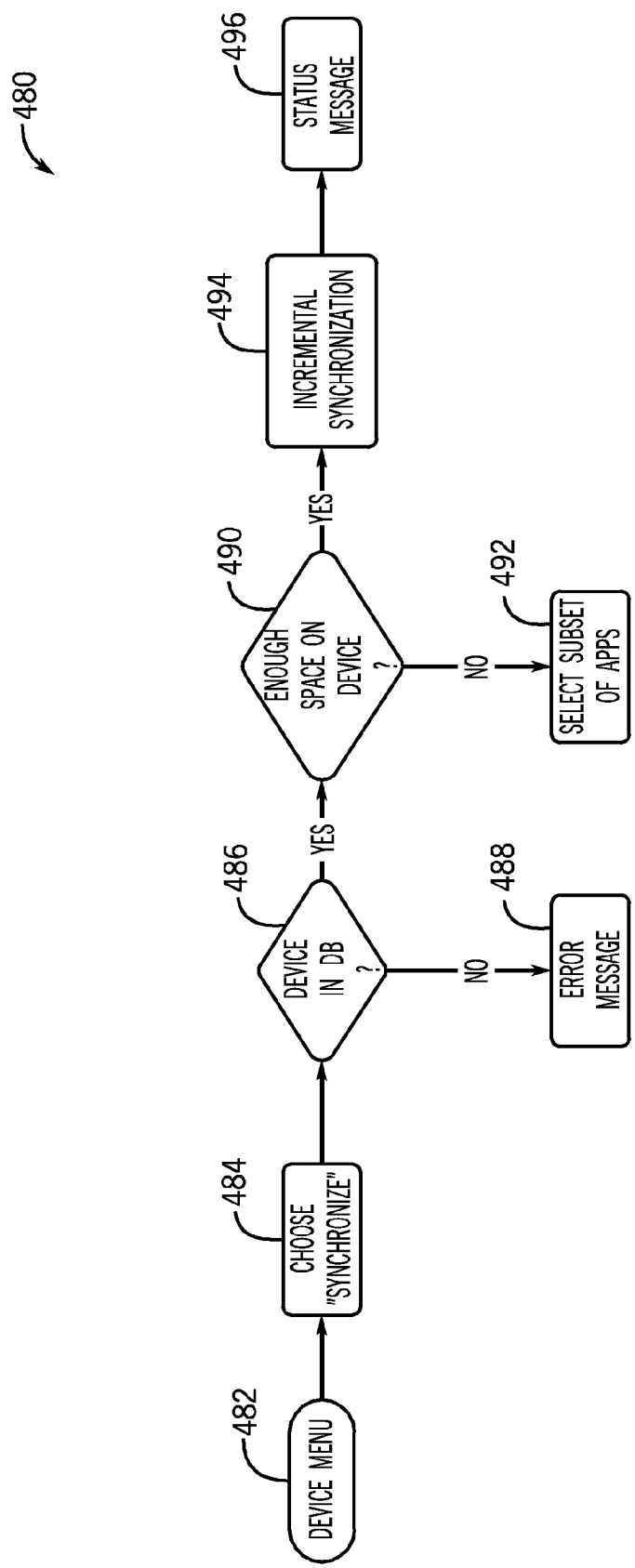
FIG. 12 a flowchart of an embodiment of a process for using the NDT ecosystem of FIG. 8 to synchronize NDT inspection devices.

FIG. 12 is a flowchart depicting an embodiment of a process 480 suitable for synchronizing the devices 12, 22, and/or 29 with, for example, purchased and licensed digital content 320. The process 480 may be implemented by using computer executable instructions stored in the memory 316 and executed by the processor 318. In the depicted embodiment, the user may interface with a device menu 482 to select a "synchronize" activity (block 484). The synchronize activity may also be executed automatically, for example upon deriving that the digital content 320 has changed, or upon receipt of notification of changes (e.g., additions, updates, deletions) of the digital content 320. Synchronization (block 484) may also occur upon starting any of the devices 12, 22, 29, or schedule to occur in a recurring fashion (e.g., once an hour, day, week, month, year). A manager or other human or software entity may also initiate the synchronize activity (block 484) remotely, for example, when desired, or upon receipt of a notification of changes to the digital content (e.g., receipt of email). The notification may additionally be sent to the devices 12, 22, 29, which may display the notification along with, for example, a button, menu item, or control to activate to initiate the synchronization (block 484). The process 480 may then determine (block 486) if the device 12, 22, and/or 29 is found, for example, in a device database described in more detail with respect to FIG. 13 below. If it is determined (decision 486) that the device is not in the device database, the process 480 may issue an error message (block 488) and exit. If it is determined (decision 486) that the device is in the device database, the process 480 may then determine (block 490) if there is enough memory space in the device 12, 22, and/or 29 to download content 320 purchase and licensed to the device 12, 22, and/or 29. Determining factors (block 49) for syncing of content may also include NDT instrument firmware/OS software and compatibility with desired digital content 320. For example, certain digital content 320 and features within that content may only execute on certain NDT instrument hardware/software platforms and/or firwmare/OS software versions. If it is determined that there is not enough space or that the NDT device 12 is not compatible with the desired content 320 (decision 490), the process 480 may then enable the selection (block 492) of a subset of digital content 320, such as executable 322 applications that may fit in the memory and/or that are compatible with the NDT device 12.

If it is determined that there is enough space (decision 490), the process 480 may then incrementally synchronize (block 494) the selected content 320, which may include firmware, into the device's memory. For example, the memory may be incrementally "flashed" to add the content 320. Once the content 320 is added, the process 480 may then display (block 496) a status message indicative of the synchronization of the content 320. By enabling a more efficient NDT-based synchronization process 480, the techniques described herein may provide for a variety of content 320 that is more easily distributed across entities and geographies.

Figure 13:
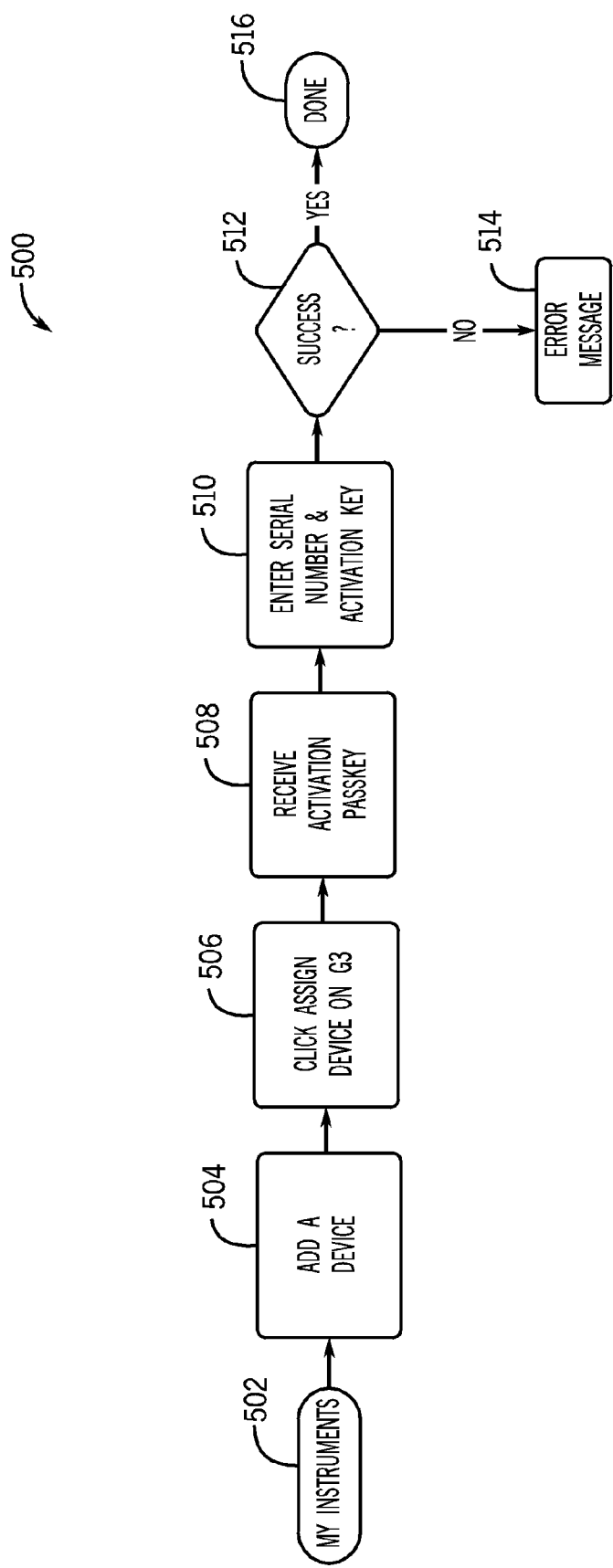
FIG. 13 a flowchart of an embodiment of a process for using the NDT ecosystem of FIG. 8 to manage NDT inspection devices.

Turning now to FIG. 13, the figure is a flowchart illustrating an embodiment of a process 500 suitable for adding a device, such as the NDT devices 12, mobile device 22, and or computing system 29 to the NDT ecosystem 300. For example, users (e.g., 302, 304, 306, 308, 310, 312, and 314) may log into the licensing/asset management system 333 and use a "My Instruments" system 502 to add a device (block 504). In the depicted embodiment, the device may be added by activating or clicking (block 506) a device assignment (e.g., button, menu item) on the device 12, 22, and/or 29 itself, which may then communicate with the system 502. An activation passkey may be received (block 508) either on the device 12, 22, and/or 29 or in another device, for example, sent by the system 502. The user may then enter (block 510) a serial number and the activation key into a screen (e.g., My Instruments screen), or other identifying information used in identifying the device to be added, for example, to a list of devices kept by the stores 326. The information may be checked (decision 512) for validity, and if not successful, the process 500 may issue an error message (block 514). If it is determined (decision 512) that the information is valid, the process 500 may add the device to the device database, for example linked to the user's account, and complete execution (block 516). In another embodiment, information embedded in the device 12, 22, 29 or added to the device may be used to automatically authenticate the device. Accordingly, the process 500 may more efficiently commission or otherwise add devices 12, 22, and/or 29 for participation in the ecosystem 300.

Technical effects of the invention include providing for an NDT ecosystem useful in increasing collaboration between parties, including but not limited to asset owners, inspection solution providers, regulatory entities, asset OEMs, asset inspection providers, and application developers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable medium comprising executable instructions which, when executed by a processor, cause the processor to:
   automatically communicatively couple a non-destructive testing (NDT) device to an external system, wherein the NDT device comprises a sensor configured to non-destructively observe a machinery;
   automatically receive a notification from the external system that an update to a digital content has been placed onto the external system;
   transmit equipment type identification information to the external system based on the notification;
   receive a space requirement based on the update to the digital content; and
   compare a memory space to the space requirement, and if the memory space is greater than the space requirement, receive the update to the digital content based on the equipment type identification, wherein the equipment type identification identifies a type of equipment to be inspected, wherein the digital content is configured to be executed by, used by, or displayed by the NDT device, or a combination thereof, and wherein the digital content comprises a digital equipment manual, an inspection procedure, a training procedure, a regulatory document, a regulatory procedure, audio, video, text, multimedia, an interactive computer simulation, a device driver, a firmware, a configuration file, a configuration related file, an NDT executable application, an application programming interfaces (API), or a combination thereof.

2. The non-transitory computer readable medium of claim 1, wherein the processor is configured to automatically transmit the equipment type identification information to the external system upon receipt of the notification.

3. The non-transitory computer readable medium of claim 2, wherein the processor is configured to receive the digital content automatically after the notification of the update to the digital content.

4. The non-transitory computer readable medium of claim 3, wherein the notification of the update of the digital content comprises an automatic notification based on additions, deletions, or updates to the digital content.

5. The non-transitory computer readable medium of claim 1, wherein the NDT device comprises an input device and the processor is configured to read an input from the input device to determine the equipment type.

6. The non-transitory computer readable medium of claim 5, wherein the input device comprises a scanner.

7. The non-transitory computer readable medium of claim 1, wherein the processor is configured to receive instructions to remove a second digital content from a memory included in the NDT device after transmitting the equipment type identification information.

8. The non-transitory computer readable medium of claim 1, wherein the processor is configured to receive instructions to modify a second digital content from a memory included in the NDT device after transmitting the equipment type identification information.

9. The non-transitory computer readable medium of claim 1, wherein the NDT device comprises a borescope, a pan-tilt-zoom (PTZ) camera, an ultrasonic inspection device, an eddy current inspection device, an X-ray inspection device, or a combination thereof having the processor.

10. A system comprising:
a non-destructive testing (NDT) device comprising a memory, a sensor, and a processor configured to:
automatically communicatively couple the NDT device to an external system, wherein the sensor is configured to non-destructively observe a machinery;
automatically receive a notification from the external system that an update to a digital content has been placed onto the external system;
transmit a equipment type identification information;
receive instructions to add, modify, or delete a digital content based on the equipment type identification information, wherein the equipment type identification identifies a type of equipment to be inspected; and
execute the instructions, wherein the memory is configured to store the digital content, and wherein the digital content comprises a digital equipment manual, an inspection procedure, a training procedure, a regulatory document, a regulatory procedure, audio, video, text, multimedia, an interactive computer simulation, a device driver, a firmware, a configuration file, a configuration related file, an NDT executable application, an application programming interfaces (API), or a combination thereof.

11. The system of claim 10, wherein the instructions to add or modify the digital content comprise instructions to download the digital content from an online store.

12. The system of claim 10, wherein the processor is configured to automatically transmit the equipment type identification information to the external system upon receipt of the notification.

13. The system of claim 10, wherein the processor is configured to automatically receive the digital content after the notification.

14. A method for synchronizing a plurality of non-destructive testing (NDT) devices, the method comprising:
automatically selecting the plurality of NDT devices for synchronization based on an update to a digital content that has been placed onto an external system;
automatically transmitting from the external system a notification of the update to each NDT device of the plurality of NDT devices;
transmitting a equipment type identification information from each NDT device to the external system;
receiving, on each NDT device, a space requirement based on the update to the digital content; and
comparing, on each NDT device, a memory space to the space requirement, and if the memory space is greater than the space requirement, receiving the update to the digital content based on the equipment type identification, wherein the equipment type identification identifies a type of equipment to be inspected, wherein the digital content is configured to be executed by, used by, or displayed by a non-destructive testing (NDT) device, or a combination thereof, and wherein the digital content comprises a digital equipment manual, an inspection procedure, a training procedure, a regulatory document, a regulatory procedure, audio, video, text, multimedia, an interactive computer simulation, a device driver, a firmware, a configuration file, a configuration related file, an NDT executable application, an application programming interfaces (API), or a combination thereof.

15. The method of claim 14, comprising automatically transmitting the equipment type identification information to the external system upon receipt of the notification.

16. The method of claim 14, comprising automatically receiving the digital content after determining that the memory space is greater than the space requirement.

17. The method of claim 14, wherein a first NDT device of the plurality of NDT devices comprises an input device and a processor, and wherein the processor is configured to read an input from the input device to determine a specific equipment type and to download the a customized digital content configured to target inspections for the specific equipment type based on the input.

18. The method of claim 17, wherein the customized digital content is derived based on a license to execute, to use, or to display the customized digital content.

* * * * *